US012219043B1

(12) United States Patent
Rososhek et al.

(10) Patent No.: US 12,219,043 B1
(45) Date of Patent: Feb. 4, 2025

(54) METHOD AND SYSTEM FOR HOMOMORPHIC ENCRYPTION

(71) Applicants: Semen Konstantinovich Rososhek, Haifa (IL); Ilya Rososhek, Haifa (IL)

(72) Inventors: Semen Konstantinovich Rososhek, Haifa (IL); Ilya Rososhek, Haifa (IL)

(*) Notice: Subject to any disclaimer, the term of this patent is extended or adjusted under 35 U.S.C. 154(b) by 0 days.

(21) Appl. No.: 18/759,262

(22) Filed: Jun. 28, 2024

(51) Int. Cl.
*H04L 9/32* (2006.01)
*H04L 9/00* (2022.01)

(52) U.S. Cl.
CPC .................... *H04L 9/008* (2013.01)

(58) Field of Classification Search
CPC ........................................ H04L 9/008
USPC ............................................ 713/168
See application file for complete search history.

(56) References Cited

U.S. PATENT DOCUMENTS

2013/0329883 A1* 12/2013 Tamayo-Rios .......... H04L 9/008
380/28
2014/0177828 A1* 6/2014 Loftus .................... H04L 9/0852
380/44
2015/0033033 A1* 1/2015 Halevi .................... H04L 9/008
713/189

* cited by examiner

*Primary Examiner* — Jeffrey C Pwu
*Assistant Examiner* — Samuel Ambaye
(74) *Attorney, Agent, or Firm* — Michael D. Eisenberg

(57) ABSTRACT

A system for matrix-based homomorphic encryption including a processor of a computing node configured to host a homomorphic encryption module and connected to at least one cloud server and a memory on which are stored machine-readable instructions that when executed by the processor, cause the processor to: acquire plaintext M required to be encrypted; select a size of a matrix $\ell$ and modulus n; select invertible $\ell \times \ell$ matrix $S_1$ over $\mathbb{Z}_n$, wherein $\mathbb{Z}_n$ is a residue ring modulo n; compute an invertible $\ell \times \ell$ matrix $S_2$ over $\mathbb{Z}_n$; set a secret key $(S_1, S_2)$; and encode the plaintext M by an integer m over $\mathbb{Z}_n$, wherein m is encoded by an envelope matrix comprising a form $$V(m) = \left(\begin{array}{c|c} \alpha & 0 \\ \hline \beta & m \end{array}\right),$$

wherein $\alpha$ and $\beta$ are numbers chosen at random $\alpha, \beta \in \mathbb{Z}_n$.

20 Claims, 12 Drawing Sheets

METHOD AND SYSTEM FOR HOMOMORPHIC ENCRYPTION

FIELD OF DISCLOSURE

The present disclosure generally relates to data security based on encryption, and more particularly, to a system and method for homomorphic encryption using matrices.

BACKGROUND

Data encryption is a process of transformation of plaintext data to ciphertext form which is not readable by unauthorized parties. Encryption is performed by encryption key, which is public, in case of a public key encryption, and private, in case of a symmetric encryption. Examples of the symmetric encryption are ciphers DES and AES. Examples of the public key encryption are RSA and ElGamal schemes.

Increasing adoption of cloud raises concerns about security and privacy of sensitive data placed in the cloud. A conventional data security solution is data encryption. However, to use data encrypted by conventional cipher such as AES cannot be used within cloud infrastructure. Encryption by the conventional cipher can be very expensive and creates problems of operations over ciphertexts. Conventional cryptosystems cannot operate with ciphertexts without decryption. The homomorphic encryption allows for these operations. The homomorphic encryption is a cryptosystem in which a sum of two ciphertexts produces a ciphertext that corresponds to the plaintext which is a sum of corresponding plaintexts. In homomorphic encryption scheme, the same is true for ciphertexts multiplication, division and subtraction.

For example, given plaintext $m_1$ and $m_2$, after encryption the ciphertexts are generated as:

$$c_1 = E(m_1) \text{ and } c_2 = E(m_2).$$

Where: $c_1$, $c_2$—ciphertexts, E—encryption, $m_1$, $m_2$—plaintexts.

Performing addition and multiplication may be implemented as:

$$C_1 + C_2 = E(m_1) + E(m_2) = E(m_1 + m_2)$$

$$C_1 \cdot C_2 = E(m_1) \cdot E(m_2) = E(m_1 \cdot m_2).$$

Where: $c_1, c_2$—ciphertexts, E—encryption, $m_1$, $m_2$—plaintexts.

Homomorphic encryption enables to perform private computations over sensitive data.

With the exponential growth of data generation, information is dispersed across various platforms, including databases managed by different entities, such as cloud service providers (CSPs). Organizations often rely on the CSPs for data storage and processing solutions. While the CSPs offer control mechanisms for the data stored in their databases, these controls are contingent on the CSP's policies and infrastructure.

Users often resort to encrypting their data before storing it, be it in a CSP's database or elsewhere, to bolster security. However, encrypted data presents challenges when it comes to performing operations on it. Traditional encryption schemes like AES necessitate decryption before any computation, making tasks like searching through encrypted data cumbersome and costly.

As mentioned above, Fully Homomorphic Encryption (FHE) can address these shortcomings because the FHE enables computations to be carried out directly on the encrypted data as can be seen at least from the following publications:

M. Chenal and Q. Tang, "On key recovery attacks against existing somewhat homomorphic encryption schemes," in Progress in Cryptology—LATINCRYPT 2014, pp. 239-258, Springer International Publishing, 2015.

I. Chillotti, N. Gama, and L. Goubin, "Attacking FHE-based applications by software fault injections," Cryptology ePrint Archive, 2016.

B. Chaturvedi, A. Chakraborty, A. Chatterjee, and D. Mukhopadhyay, "A practical full key recovery attack on TFHE and FHEW by inducing decryption errors," Cryptology ePrintArchive, 2022.

A. Menezes et al., Handbook of Applied Cryptography. 1996.

Thus, users can store their data in an encrypted format, whether in their own databases or with CSPs, and still conduct necessary operations without decrypting the data. The FHE not only enhances data security and privacy but also facilitates seamless data processing across various platforms, reducing the need for frequent decryption and encryption cycles.

However, existing FHE schemes are based on Learning with Errors (LWE) or Ring learning with Errors (RLWE) hardness assumptions. Thus, the small noise is always added to the encryption. The noise growth under computation may achieve the level when decryption is no longer possible. While some current FHE scheme perform various operations over ciphertexts that only reduce noise growth, the significant bottlenecks still exist for the users. In that respect, the most usable are Leveled FHE which support fixed depth of computations. The bootstrapping allows to remove noise and, theoretically, allows for arbitrary deep computation. However, in practice this approach is avoided due to its extremely high computational expense. Additionally, in real world applications, malicious or compromised server can perform practical key recovery attacks[1-3], thereby completely undermining confidentiality of FHE-protected data. Thus, existing FHE schemas are not practical due to integrity issues along with performance, noise growth, ciphertext size and the like.

Accordingly, a system and method for an efficient and effective homomorphic encryption of data are desired.

BRIEF OVERVIEW

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

One embodiment of the present disclosure provides a system for matrix-based homomorphic encryption including a processor of a computing node configured to host a homomorphic encryption module and connected to at least one cloud server and a memory on which are stored machine-readable instructions that when executed by the processor, cause the processor to: acquire plaintext M required to be encrypted; select a size of a matrix $\ell$ and modulus n; select invertible $\ell \times \ell$ matrix $S_1$ over $\mathbb{Z}_n$, wherein $\mathbb{Z}_n$ is a residue ring modulo n; compute an invertible $\ell \times \ell$ matrix $S_2$ over $\mathbb{Z}_n$; set a secret key $(S_1, S_2)$; and encode the plaintext M by an integer m over $\mathbb{Z}_n$, wherein m is encoded by an envelope matrix comprising a form $$V(m) = \left(\begin{array}{c|c}\alpha & 0 \\ \hline \beta & m\end{array}\right),$$

wherein α and β are numbers chosen at random α, β∈ $\mathbb{Z}_n$.

Another embodiment of the present disclosure provides a method that includes one or more of: acquiring plaintext M required to be encrypted; selecting a size of a matrix $\ell$ and modulus n; selecting invertible $\ell \times \ell$ matrix $S_1$ over $\mathbb{Z}_n$, wherein $\mathbb{Z}_n$ is a residue ring modulo n; computing an invertible $\ell \times \ell$ matrix $S_2$ over $\mathbb{Z}_n$; set a secret key $(S_1, S_2)$; and encoding the plaintext M by an integer m over $\mathbb{Z}_n$, wherein m is encoded by an envelope matrix comprising a form $$V(m) = \left(\begin{array}{c|c}\alpha & 0 \\ \hline \beta & m\end{array}\right),$$

wherein α and β are numbers chosen at random α, β∈ $\mathbb{Z}_n$.

Another embodiment of the present disclosure provides a computer-readable medium including instructions for acquiring plaintext M required to be encrypted; selecting a size of a matrix $\ell$ and modulus n; selecting invertible $\ell \times \ell$ matrix $S_1$ over $\mathbb{Z}_n$, wherein $\mathbb{Z}_n$ is a residue ring modulo n; computing an invertible $\ell \times \ell$ matrix $S_2$ over $\mathbb{Z}_n$; set a secret key $(S_1, S_2)$; and encoding the plaintext M by an integer m over $\mathbb{Z}_n$, wherein m is encoded by an envelope matrix comprising a form $$V(m) = \left(\begin{array}{c|c}\alpha & 0 \\ \hline \beta & m\end{array}\right),$$

wherein α and β are numbers chosen random α, β∈ $\mathbb{Z}_n$.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings may contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings.

DETAILED DESCRIPTION

Figure 1:
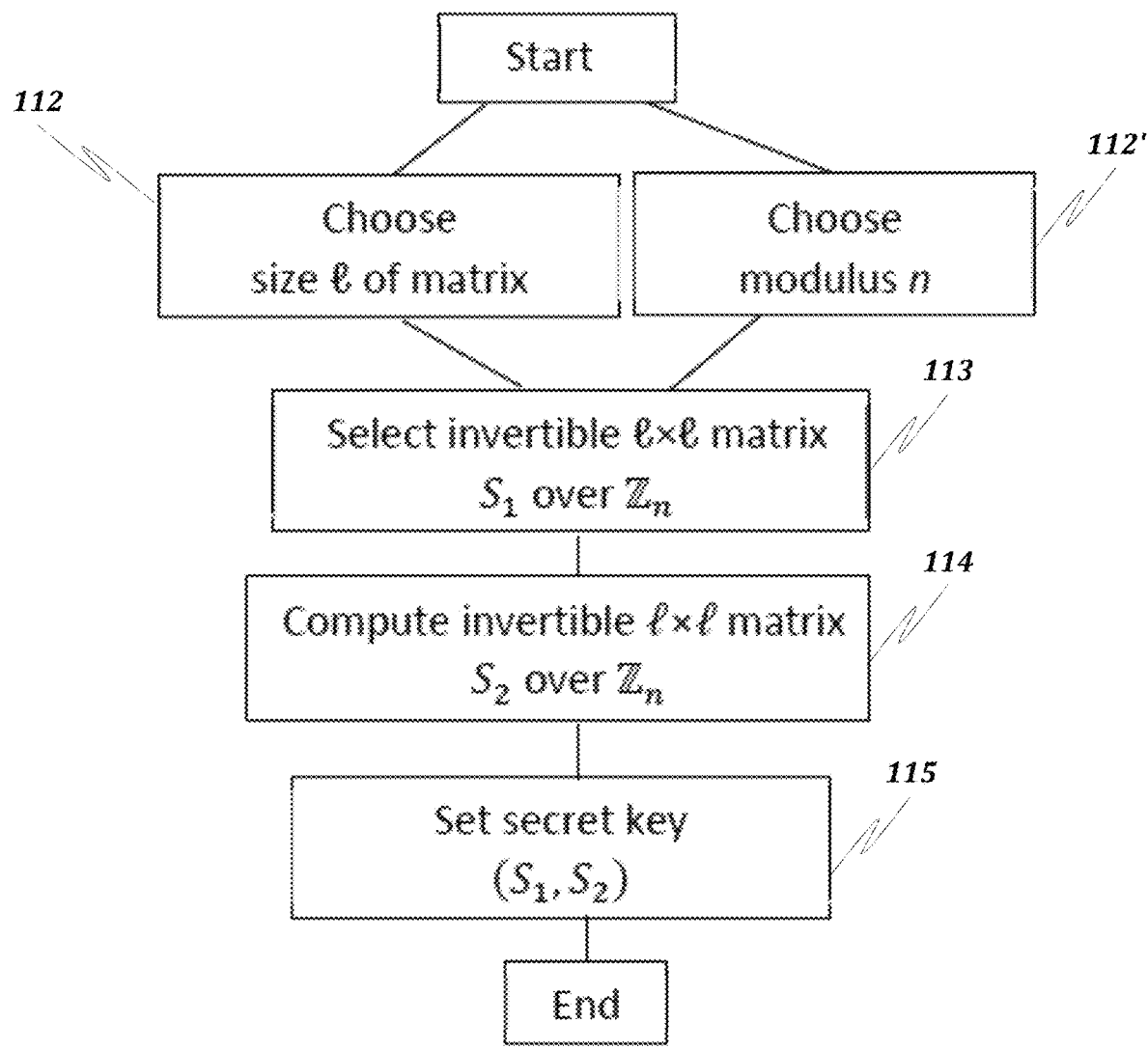
FIGS. 1 and 2 illustrate flowcharts of a method for common key generation consistent with the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, itis to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention.

Accordingly, it is intended that the scope of patent protection is to be defined by the issued claim(s) rather than the description set forth herein.

Additionally, it is important to note that each term used herein refers to that which an ordinary artisan would understand such a term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subject matter disclosed under the header.

The present disclosure provides a system, method and computer-readable medium for a homomorphic encryption based on matrices and operations on encrypted data. In one embodiment, the system overcomes the limitations of existing encryption systems and methods by leveraging the capabilities of novel matrix-based fully homomorphic encryption. The disclosed approach offers a significant improvement over existing solutions discussed above in the background section.

In one embodiment of the present disclosure, the system provides for operations on encrypted data. A user can search over his encrypted with the disclosed homomorphic encryption scheme data using a homomorphic index feature.

The user can perform all four arithmetic operations over ciphertexts which, for example, permits to compute for statistical computations over encrypted data.

In one embodiment, the user can check integrity of his data without decryption by using Homomorphic Hash feature.

The user can outsource his homomorphically encrypted data, i.e., to get some profit from this asset(s).

With the above-mentioned novel features, the disclosed matrix-based homomorphic encryption provides for complete privacy-preserving data processing compliant with GDPR, HIPAA and other authorities.

According to the disclosed embodiments, the encryption ecosystem consists of many components, almost each of which can function independently but collectively provide a comprehensive approach to multidisciplinary utilization, offering a set of unprecedented advantages and unique properties. The system may be referred to as the Crypto Engine implemented as an encryption module. The unique components include:

1. Key Generator (public/private);
2. Encryption and Decryption Modules and sub-modules;
3. Homomorphic Arithmetic Operations sub-module;
4. Homomorphic Comparison of Cipher Texts functions sub-module;
5. Homomorphic Hash function sub-module;
6. Homomorphic Index function sub-module (for database indexing and searching of the encrypted data) that provides for searchable encryption functionality; and
7. Service keys—unique entity serves for FHE Hash or being used as a stand-alone private key used for encryption only.

Figure 2:
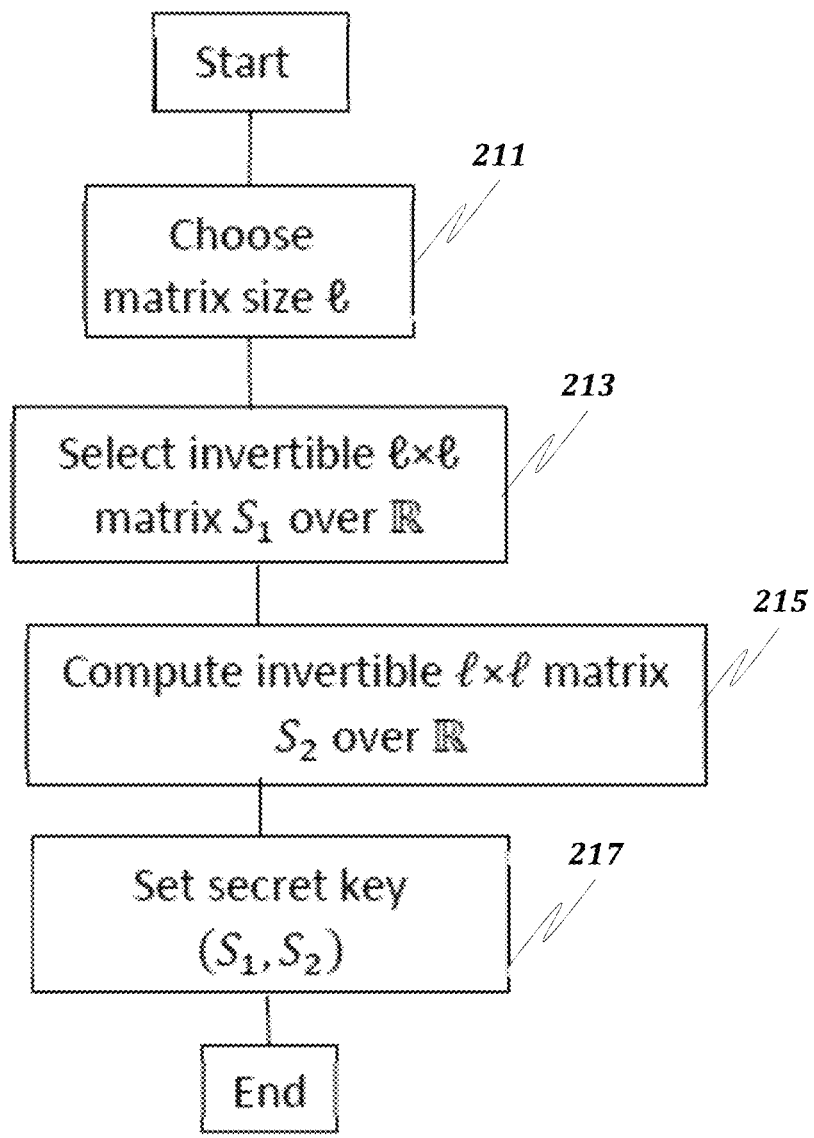

FIGS. 1 and 2 illustrate flowcharts of a method for common key generation consistent with the present disclosure.

Referring to FIGS. 1 and 2, the disclosed method may include one or more of the steps described below. FIGS. 1 and 2 illustrate a flow chart of an example method(s) executed by the homomorphic encryption module that may be hosted on a user computing device or on a server. It should be understood that the method depicted in FIGS. 1 and 2 may include additional operations and that some of the operations described therein may be removed and/or modified without departing from the scope of the disclosed method. The description of the disclosed method is also made with reference to the features depicted in FIG. 10 discussed below for purposes of illustration. Particularly, the processor 204 of the user computing entity node 101 may execute some or all of the operations included in the disclosed method.

With reference to FIGS. 1 and 2, common key generation is disclosed where:

$\ell$—matrix size, $S_1, S_2$—invertible matrix, $\mathbb{Z}_n$—residue ring modulo n, and $\mathbb{R}$—field of real numbers.

At block 112, the processor 204 may choose $\ell$—matrix size. At block 112', the processor 204 may choose modulus n. The modulus n of residue ring $\mathbb{Z}_n$ may be chosen via security parameter $\lambda$, i.e., n has bitlength $\lambda$ (typically the process chooses $\lambda=256$). For simplicity the process may choose l=2. At block 113, the processor 204 may select invertible $\ell \times \ell$ matrix S over $\mathbb{Z}_n$. In example, invertible 2×2 matrix S over $\mathbb{Z}_n$ may be chosen based linear algebra transformations. At block 114, the processor 204 may compute invertible matrix $S_2$ over $\mathbb{Z}_n$. In example, invertible 2×2-matrix $S_1^{-1}$ and $S_2^{-1}$ over $\mathbb{Z}_n$ may be computed based on linear algebra transformations. At block 115, the processor 204 may set the secret key $(S_1, S_2)$.

Referring to FIG. 2, at block 211, the processor 204 may choose $\ell$—matrix size. For simplicity l=2 may be chosen. At block 213, the processor 204 may select invertible 1× $\ell$ matrix S over. At block 215, the processor 204 may compute invertible matrix $S_2$ over $\mathbb{R}$ by selecting and computing $S_1$ and $S_1^{-1}$, $S_2$ and $S_2^{-1}$ based on linear algebra transformations. At block 217, the processor 204 may set the secret key $(S_1, S_2)$.

According to one disclosed embodiment, a Symmetric Key generation schema may be implemented as follows. A matrix S may be computed based on generation of a random matrix R. The matrix R is generated as following:

a random X-bit integer k (λ—security parameter) is selected;

compute power $R^k$ using matrix analogue of algorithm right-to-left binary exponentiation from. By choosing a sufficiently large λ (e.g., λ=256), the schema provides high security level maintaining hardness of Discrete Logarithm Problem for such value of λ.

Finally, we assume $S=R^k$, compute inverse matrix $S^{-1}$ end we get symmetric key $(S, S^{-1})$. We consider this key as the most resistant to any attack, while actually the basic encryption scheme remains the same.

While FIGS. 1 and 2 disclose symmetric key generation, pubic key encryption schema may be implemented with the disclosed matrix-based Fully Homomorphic Encryption method as follows.

Select two invertible 2×2 random matrices over residue ring $\mathbb{Z}_n$, representing master key K and private key S. First encryption layer is using master key K as encryption key in basic scenario of symmetric Fully Homomorphic Encryption scheme used to encrypt each element of matrices S and $S^{-1}$, $(S, S^{-1})$ is private key.

Specifically, for $$S = \left(\begin{array}{c|c} s_{1,0} & s_{1,1} \\ \hline s_{1,2} & s_{1,3} \end{array}\right), \quad S^{-1} = \left(\begin{array}{c|c} s_{2,0} & s_{2,1} \\ \hline s_{2,2} & s_{2,3} \end{array}\right)$$

we compute $$p_{i,j} = Enc_K(s_{i,j}) = K^{-1}\left(\begin{array}{c|c} \alpha_{i,j} & 0 \\ \hline \beta_{i,j} & s_{i,j} \end{array}\right)K,$$

where $\alpha_{i,j}, \beta_{i,j}$ chosen at random for each i=1,2; j=0, 1, 2, 3. After padding encryption of zero for each $p_{i,j}$ we get secret public key pair:

Secret key sk=$(S, S^{-1})$, public key pk=$(P_1, P_2)$, where $$P_1 = \left(\begin{array}{c|c} p_{1,0} & p_{1,1} \\ \hline p_{1,2} & p_{1,3} \end{array}\right), \quad P_2 = \left(\begin{array}{c|c} p_{2,0} & p_{2,1} \\ \hline p_{2,2} & p_{2,3} \end{array}\right).$$

Encryption via this public key is used as a second encryption layer of the disclosed symmetric FHE scheme. Using its homomorphic properties, we use encrypted secret key $(S, S^{-1})$ as encryption key. Specifically, first encoding plaintext m by envelop matrix V(m) and compute ciphertext as follows:

$$C(m) = P_2 V(m) P_1 = \left(\begin{array}{c|c} C_0 & C_1 \\ \hline C_2 & C_3 \end{array}\right),$$

where $C_0, C_1, C_2, C_3$ are four of the 2×2-matrices over $\mathbb{Z}_n$. Decryption is performed in the inverse direction.

First we unlock first encryption layer using master key $(K, K^{-1})$ for each 2×2 block of ciphertext C(m).

Specifically, compute $T_i = KC_i K^{-1}$, for i=0, 1, 2, 3. For each $$T_i = \left(\begin{array}{c|c} t_{i,0} & t_{i,1} \\ \hline t_{i,2} & t_{i,3} \end{array}\right),$$

choose $t_{i,3}$ and form matrix $$Z = \left(\begin{array}{c|c} t_{0,3} & t_{1,3} \\ \hline t_{2,3} & t_{3,3} \end{array}\right)$$

and compute $SZS^{-1}=W$. From $$W = \left(\begin{array}{c|c} w_0 & w_1 \\ \hline w_2 & w_3 \end{array}\right)$$

extract $w_3=m$.

The disclosed public key FHE scheme inherits all homomorphic properties of the disclosed symmetric scheme discussed above. The disclosed public key FHE scheme has four homomorphic arithmetic operations over ciphertexts (addition, subtraction, multiplication, division), homomorphic index, homomorphic hash and homomorphic comparison.

Figure 3:
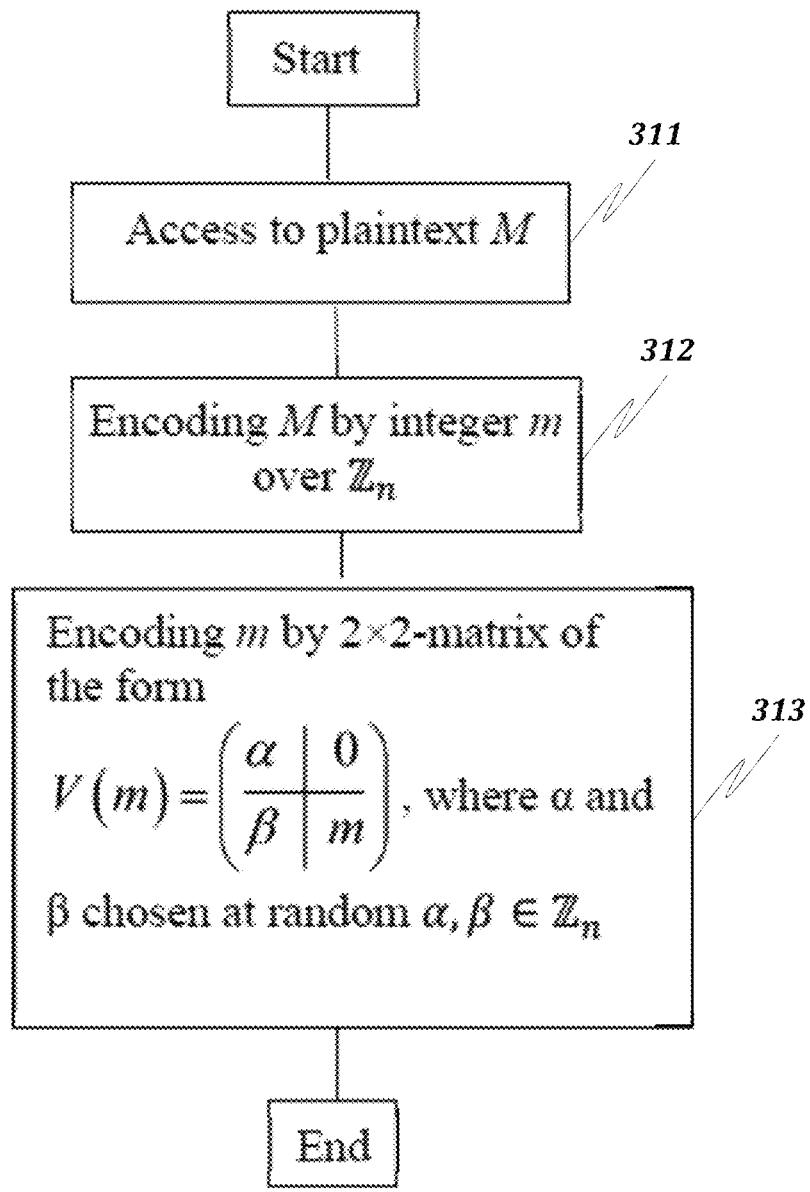
FIGS. 3 and 4 illustrate flowcharts of a method for encoding process of enveloping the plaintext before the encryption consistent with the present disclosure.
Figure 4:
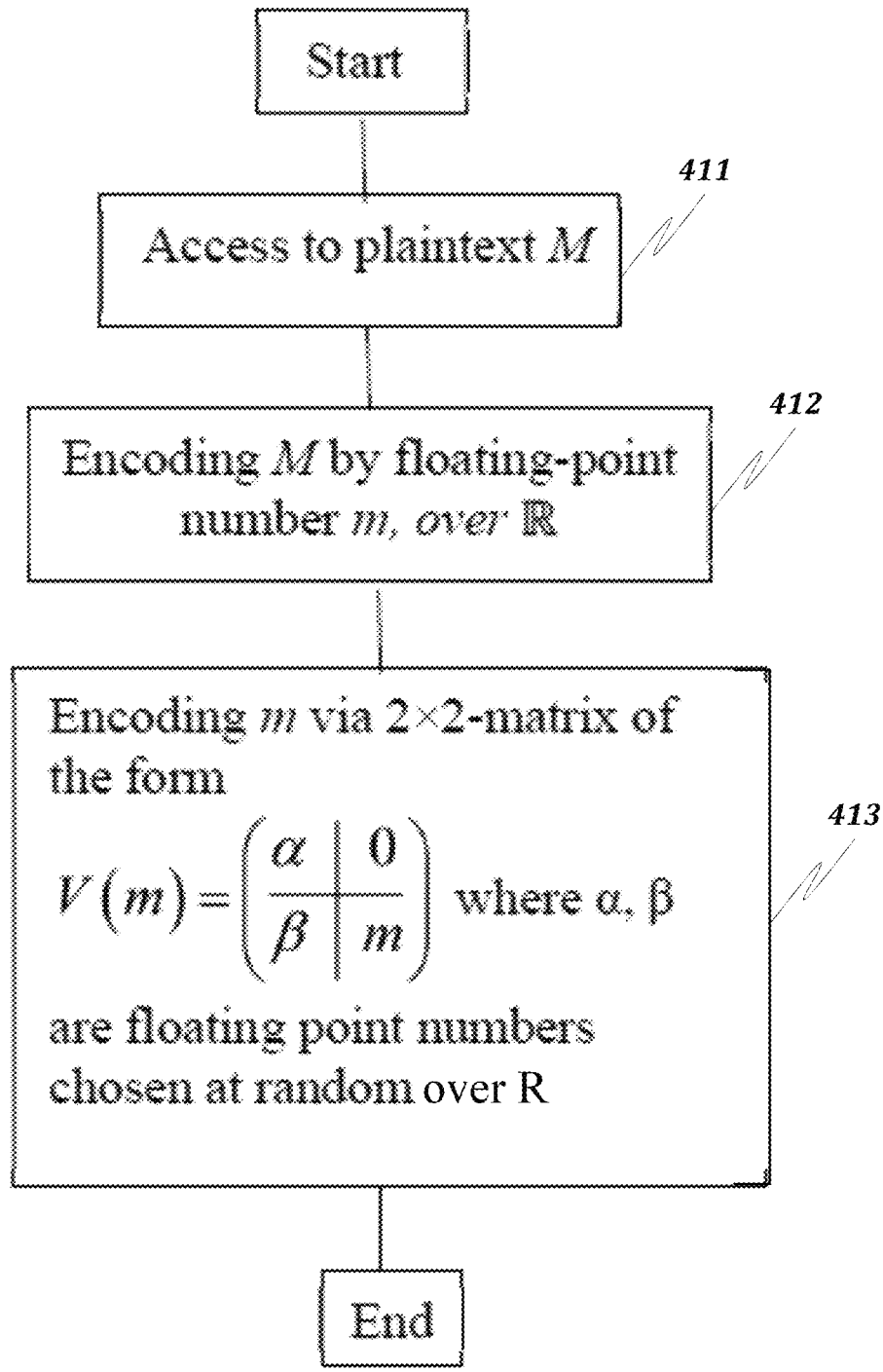

FIGS. 3 and 4 illustrate flowcharts of a method for encoding process of enveloping the plaintext before the encryption consistent with the present disclosure.

Referring to FIGS. 3 and 4, the disclosed method may include one or more of the steps described below. FIGS. 3 and 4 illustrate a flow chart of an example method(s) executed by the homomorphic encryption module that may be hosted on a user computing device or on a server. It should be understood that method depicted in FIGS. 3 and 4 may include additional operations and that some of the operations described therein may be removed and/or modified without departing from the scope of the disclosed method. The description of the disclosed method is also made with reference to the features depicted in FIG. 10 discussed below for purposes of illustration. Particularly, the processor 204 of the user computing entity node 101 may execute some or all of the operations included in the disclosed method.

Referring to FIGS. 3 and 4, matrix V(m) will be referred to as an envelope matrix for both settings (i.e., integers and floating-point). With reference to FIGS. 3 and 4, an encoding process of enveloping the plaintext before encryption is shown, where:

$\mathbb{Z}_n$—residue ring modulo n, M—plaintext, m—integer, V—envelop matrix, α,β—random numbers, $\mathbb{R}$—field of real numbers.

At block 311, the processor 204 may access the plaintext M. The processor 204 may first convert plaintext M to bit string which represents integer m. At block 312, the processor 204 may encode M by integer m over $\mathbb{Z}_n$. At block 313, the processor 204 may encode m by 2×2 matrix of the form:

$$V(m) = \begin{pmatrix} \alpha & 0 \\ \beta & m \end{pmatrix},$$

where α and β chosen at random in $\mathbb{Z}_n$.

In FIG. 4, the processor 204 may first convert plaintext to floating-point number m. At block 411, the processor 204 may access the plaintext M. At block 412, the processor 204 may encode M by floating-point number m over $\mathbb{R}$. At block 413, the processor 204 may encode m by 2×2 matrix of the form:

$$V(m) = \begin{pmatrix} \alpha & 0 \\ \beta & m \end{pmatrix},$$

where α and τ are randomly chosen over $\mathbb{R}$ floating-point numbers.

Figure 5:
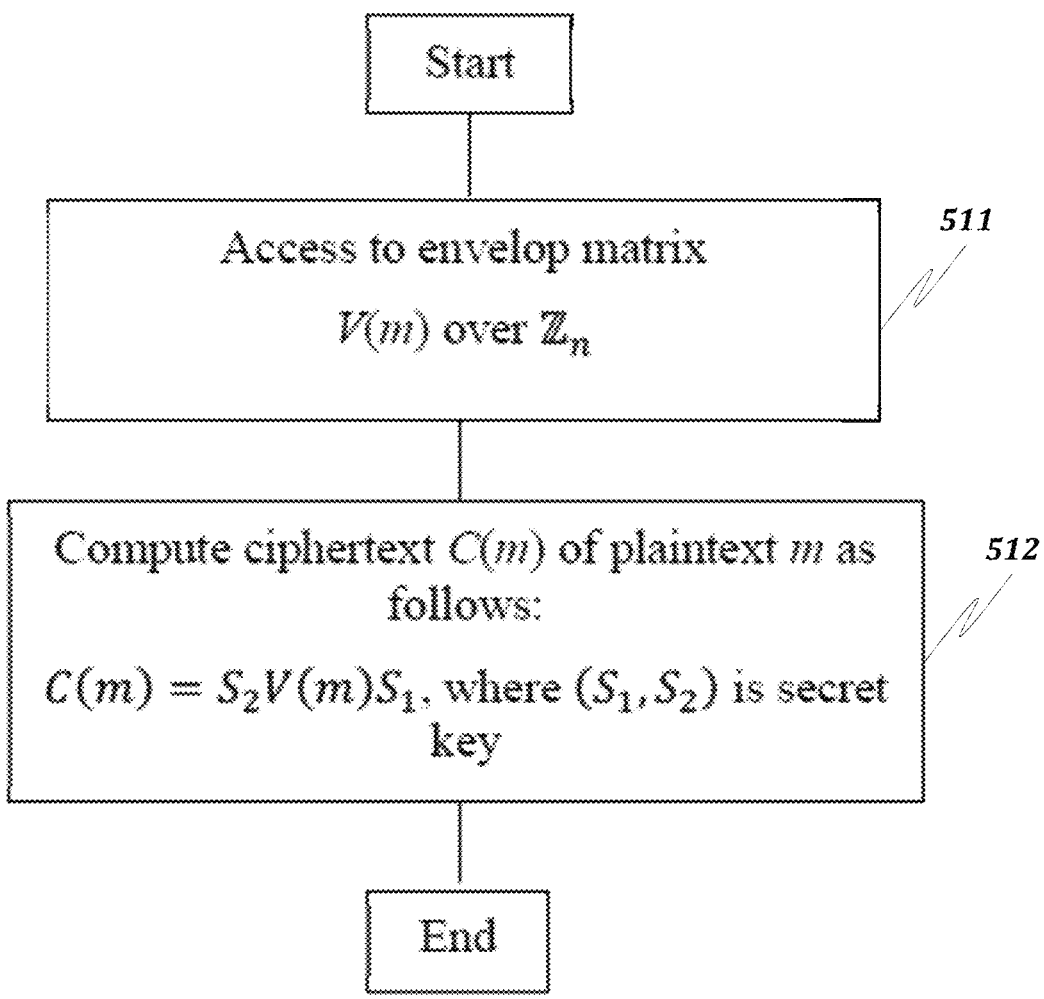
FIGS. 5 and 6 illustrate flowcharts of an encryption process based on matrices multiplication consistent with the present disclosure.
Figure 6:
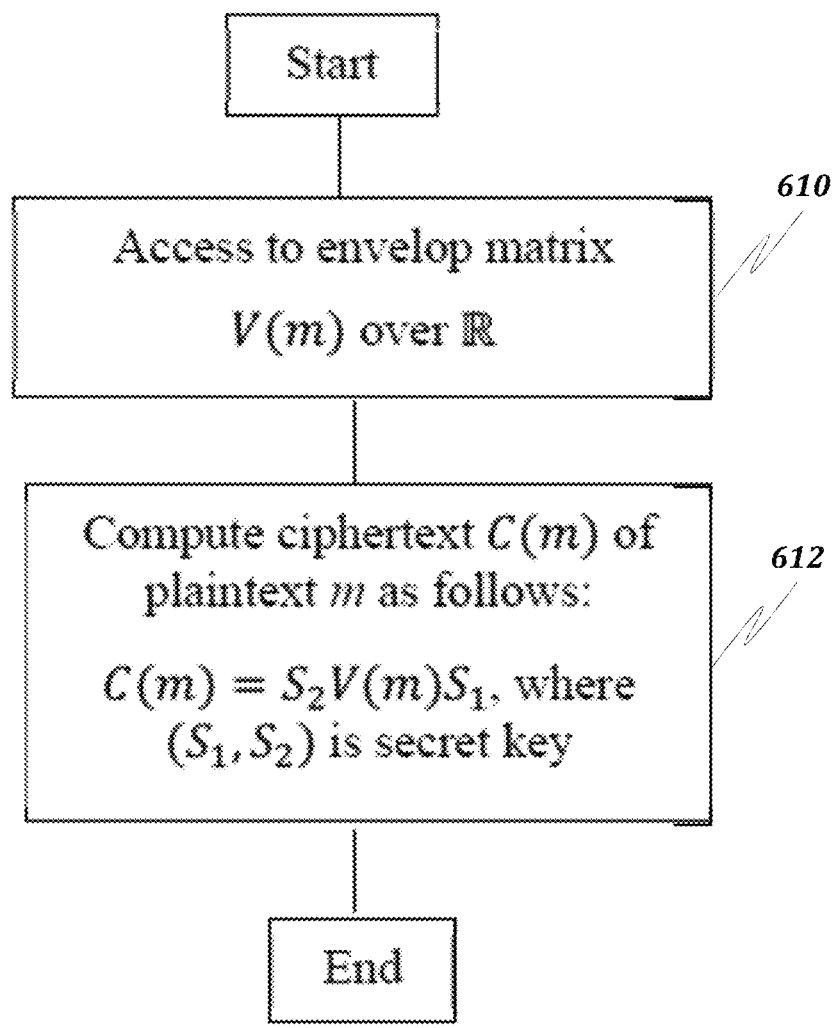

FIGS. 5 and 6 illustrate flowcharts of an encryption process based on matrices multiplication consistent with the present disclosure.

Referring to FIGS. 5 and 6, the disclosed method may include one or more of the steps described below. FIGS. 5 and 6 illustrate a flow chart of an example method(s) executed by the homomorphic encryption module that may be hosted on a user computing device or on a server. It should be understood that method depicted in FIGS. 5 and 6 may include additional operations and that some of the operations described therein may be removed and/or modified without departing from the scope of the disclosed method. The description of the disclosed method is also made with reference to the features depicted in FIG. 10 discussed below for purposes of illustration. Particularly, the processor 204 of the user computing entity node 101 may execute some or all of the operations included in the disclosed method.

With reference to FIGS. 5 and 6, an encryption process based on matrices multiplication S1, S2 is shown, where:

$\mathbb{Z}_n$—residue ring modulo n, M—plaintext, m—integer, V—envelop matrix, $S_1$, $S_2$—two matrices as a secret key, C—ciphertext, $\mathbb{R}$—field of real numbers.

At block 511, the processor 204 may access the envelope matrix V(m) over $\mathbb{Z}_n$. At block 512, the processor 204 may compute ciphertext C(m) of plaintext m as follows:

$C(m) = S_2 V(m) S_1$, where $(S_1, S_2)$ is a secret key.

Referring to FIG. 6, at block 610 the processor 204 may access the envelope matrix V(m) over $\mathbb{R}$. At block 612 the processor 204 may compute ciphertext C(m) of the plaintext m as follows:

$C(m) = S_2 V(m) S_1$, where $(S_1, S_2)$ is a secret key.

Figure 7:
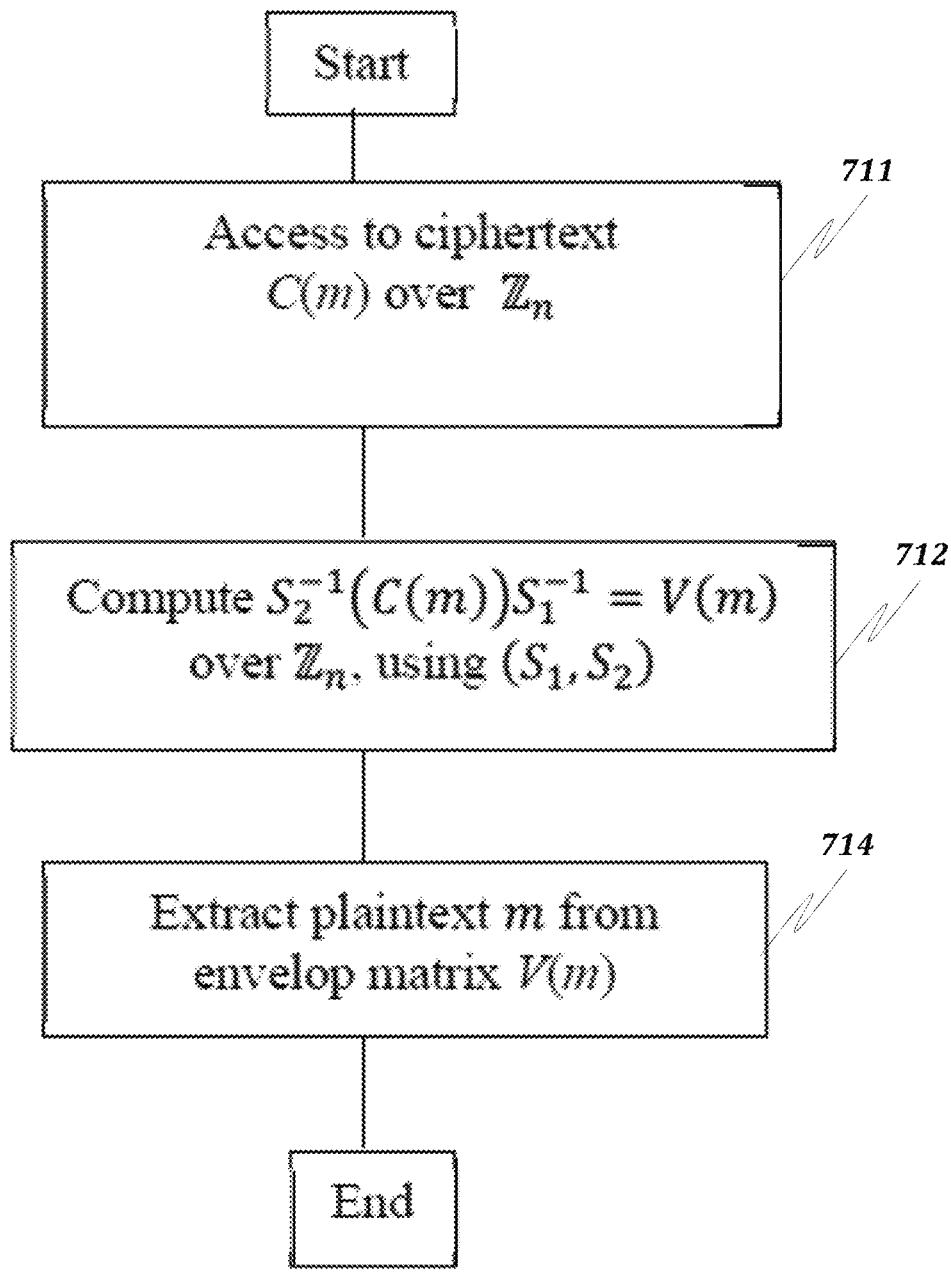
FIGS. 7 and 8 illustrate flowcharts of data decryption consistent with the present disclosure.
Figure 8:
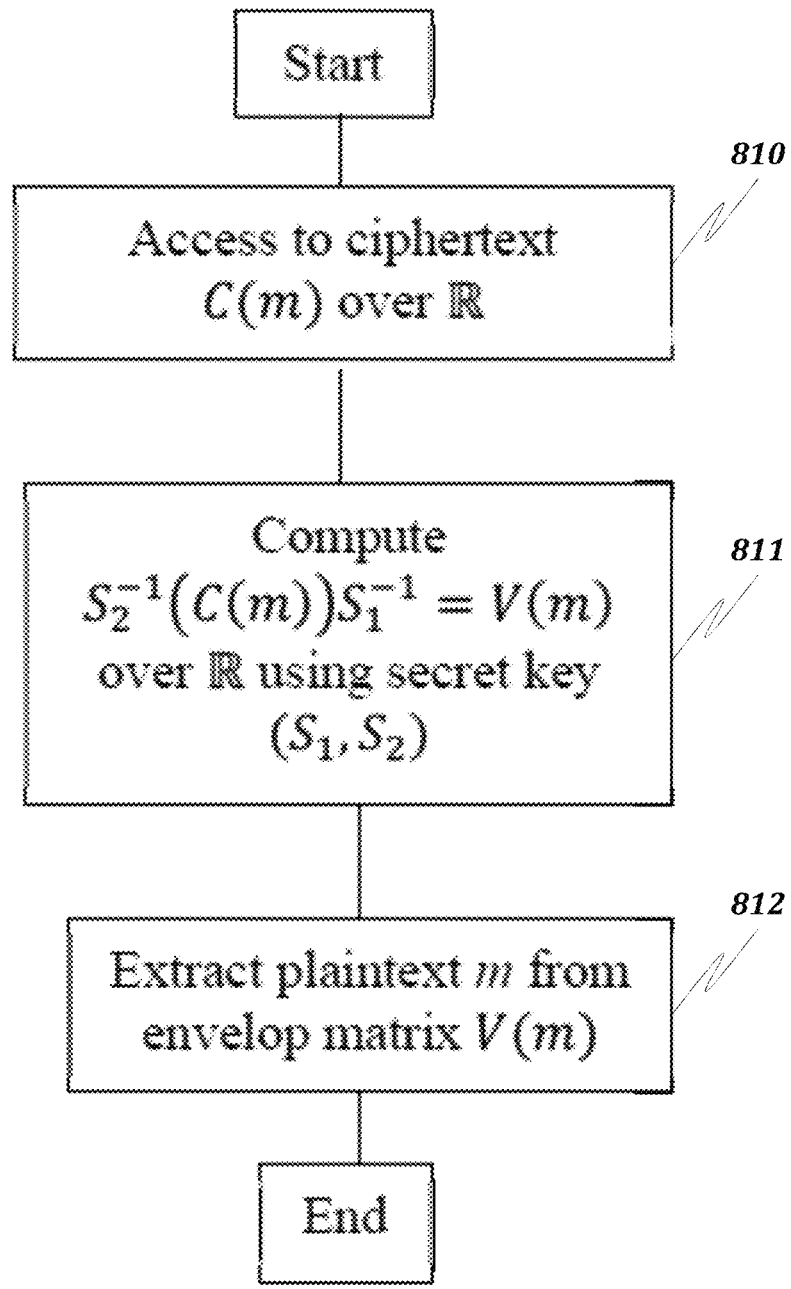

FIGS. 7 and 8 illustrate flowcharts of data decryption consistent with the present disclosure.

Referring to FIGS. 7 and 8, the disclosed method may include one or more of the steps described below. FIGS. 7 and 8 illustrate a flow chart of an example method(s) executed by the homomorphic encryption module that may be hosted on a user computing device or on a server. It should be understood that method depicted in FIGS. 7 and 8 may include additional operations and that some of the operations described therein may be removed and/or modified without departing from the scope of the disclosed method. The description of the disclosed method is also made with reference to the features depicted in FIG. 10 discussed below for purposes of illustration. Particularly, the processor 204 of the user computing entity node 101 may execute some or all of the operations included in the disclosed method.

FIGS. 7 and 8 illustrate decryption process where:

$\mathbb{Z}_n$—residue ring modulo n, M—plaintext, m—integer, V—envelop matrix, $S_1$, $S_2$-two matrices as a secret key, C—ciphertext, $\mathbb{R}$—field of real numbers, $S_1^{-1}$ and $S_2^{-1}$—inverse matrices.

Referring to FIG. 7, at block 711, the processor 204 may access to ciphertext C(m) over $\mathbb{Z}_n$. At block 712, the processor 204 may compute $S_2^{-1}(C(m))S_1^{-1} = V(m)$ over Zn, using $(S_1, S_2)$. At block 714, the processor 204 may extract plaintext m from the envelop matrix V(m):

$$V(m) = \begin{pmatrix} \alpha & 0 \\ \beta & m \end{pmatrix}$$

thus, the process can extract m from (2,2)-position.

Regarding FIG. 8, at block 810, the processor 204 may access to ciphertext C(m) over $\mathbb{R}$. At block 811, the processor 204 may compute $S_2^{-1}(C(m))S_1^{-1} = V(m)$ over $\mathbb{R}$ using secret key $(S_1, S_2)$. At block 812, the processor 204 may extract floating point number m from $$V(m) = \begin{pmatrix} \alpha & 0 \\ \beta & m \end{pmatrix}.$$

Figure 9A:
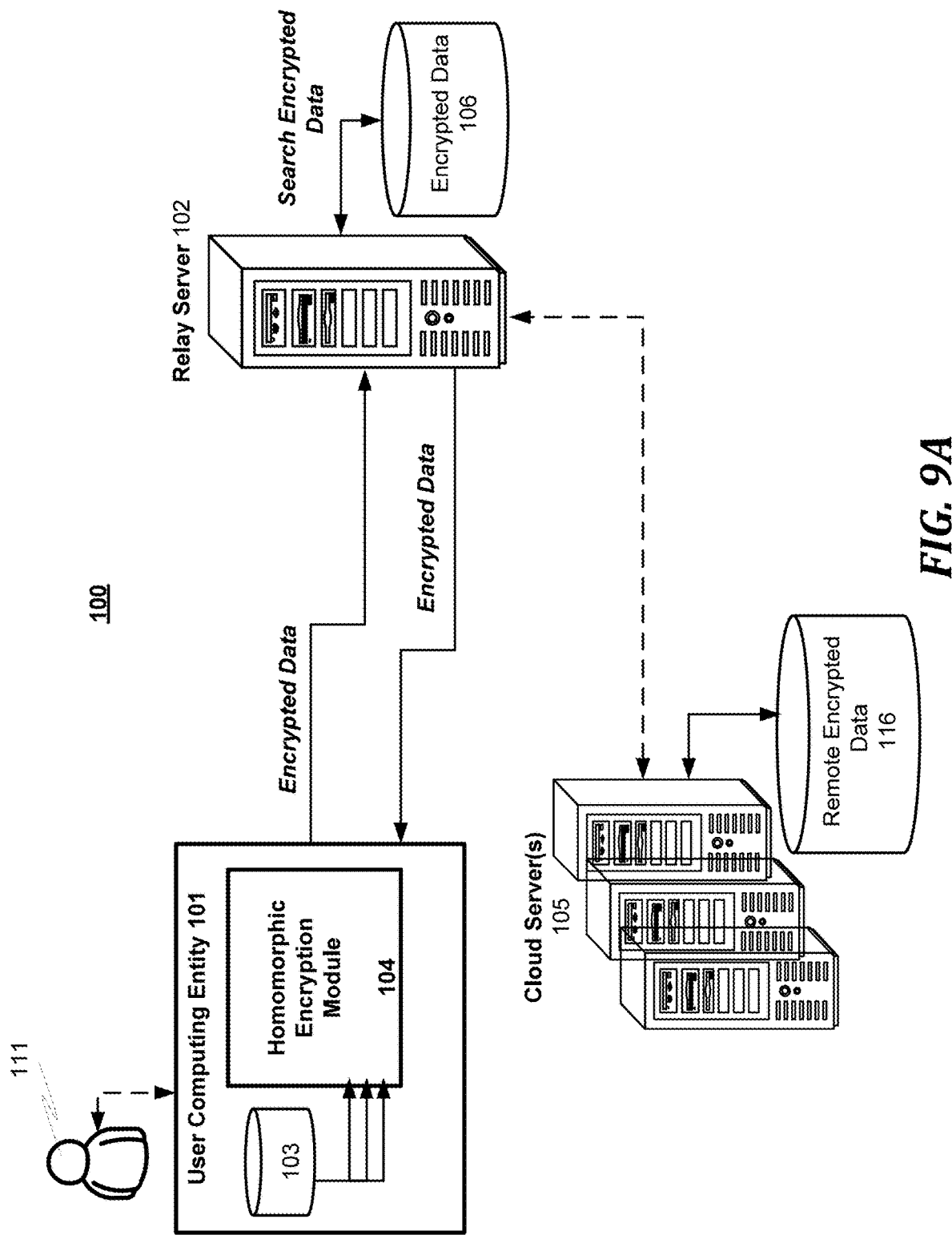
FIG. 9A illustrates a network diagram of a system for homomorphic encryption consistent with the present disclosure.

FIG. 9A illustrates a network diagram of a system for homomorphic encryption consistent with the present disclosure.

Referring to FIG. 9A, the example network 100 includes the user computing entity node 101 connected to a relay server node(s) 102 that may be connected to other cloud servers 105 over a network. The user computing entity node 101 may be configured to host a homomorphic encryption module 104. Note that the modules 104 may be implemented on other entities such as servers 102 and 105. The user computing entity node 101 may receive sensitive data from a user 111 as data being entered via an interface or retrieved as searchable stored data 103. The data may be encrypted by the homomorphic encryption module 104 and sent to the relay server 102. The encrypted data may be stored in the encrypted form on a storage 106 and may be further distributed through the network to servers 105 based on the architecture of the system network. The encrypted data from the storage 106 may be retrieved based on the user 111 request and may be provided to the user computing entity node 101 without being decrypted. Note that the data on the storage 106 may be searched in the encrypted form as discussed above based on the nature of the homomorphic encryption schema.

Figure 9B:
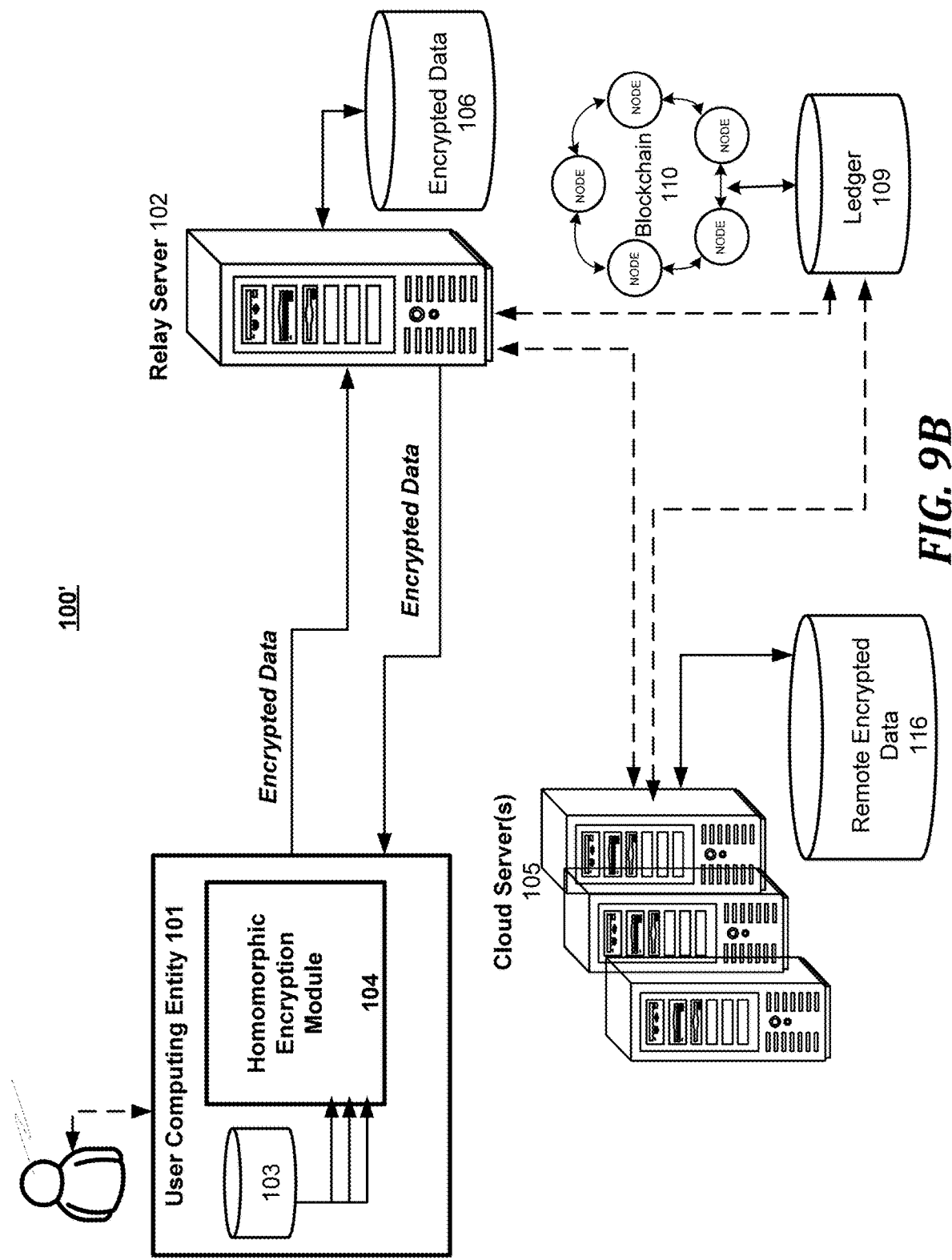
FIG. 9B illustrates a network diagram of a system for homomorphic encryption implemented over a blockchain network consistent with the present disclosure.

FIG. 9B illustrates an exemplary network diagram of a system for homomorphic encryption implemented over a blockchain network consistent with the present disclosure.

Referring to FIG. 9B, the example network 100' includes the user computing entity node 101 connected to a relay server node(s) 102 that may be connected to other cloud servers 105 over a network. The user computing entity node 101 may be configured to host a homomorphic encryption module 104. Note that the modules 104 may be implemented on other entities such as servers 102 and 105. The user computing entity node 101 may receive sensitive data from a user 111 as data being entered via an interface or retrieved as searchable stored data 103. The data may be encrypted by the homomorphic encryption module 104 and sent to the relay server 102. The encrypted data may be stored in the encrypted form on a storage 106 and may be further distributed through the network to servers 105 based on the architecture of the system network. The encrypted data from the storage 106 may be retrieved based on the user 111 request and may be provided to the user computing entity node 101 without being decrypted. Note that the data on the storage 106 may be searched in the encrypted form as discussed above based on the nature of the homomorphic encryption schema.

In another exemplary embodiment, the system 100' may use a decentralized storage such as a blockchain 110 (see FIG. 9B) that is a distributed storage system, which includes multiple nodes that communicate with each other. The decentralized storage includes an append-only immutable data structure resembling a distributed ledger capable of maintaining records between mutually untrusted parties. The untrusted parties are referred to herein as peers or peer nodes. Each peer maintains a copy of the parameter(s) records and no single peer can modify the records without a consensus being reached among the distributed peers. For example, the peers 101, 102 and 105 (FIG. 9B) may execute a consensus protocol to validate blockchain 110 storage transactions, group the storage transactions into blocks, and build a hash chain over the blocks. This process forms the ledger 109 by ordering the storage transactions, as is necessary, for consistency. In various embodiments, a permissioned and/or a permissionless blockchain can be used. In a public or permissionless blockchain, anyone can participate without a specific identity. Public blockchains can involve assets and use consensus based on various protocols such as Proof of Work (PoW). On the other hand, a permissioned blockchain provides secure interactions among a group of entities which share a common goal such as storing recommendation parameters, but which do not fully trust one another.

This application utilizes a permissioned (private) blockchain that operates arbitrary, programmable logic, tailored to a decentralized storage scheme and referred to as "smart contracts" or "chaincodes." In some cases, specialized chaincodes may exist for management functions and parameters which are referred to as system chaincodes. The application can further utilize smart contracts that are trusted distributed applications which leverage tamper-proof properties of the blockchain database and an underlying agreement between nodes, which is referred to as an endorsement or endorsement policy. Blockchain transactions associated with this application can be "endorsed" before being committed to the blockchain while transactions, which are not endorsed, are disregarded. An endorsement policy allows chaincodes to specify endorsers for a transaction in the form of a set of peer nodes that are necessary for endorsement. When a client sends the transaction to the peers specified in the endorsement policy, the transaction is executed to validate the transaction. After a validation, the transactions enter an ordering phase in which a consensus protocol is used to produce an ordered sequence of endorsed transactions grouped into blocks.

In one embodiment, the relay server node 102 may retrieve data requested by the user 111 from the permissioned blockchain 110 ledger 109 based on a consensus between the user computing entity node 101 and at least the relay server node 102. The encrypted user data received from the user computing entity node 101 may be also recorded on the ledger 109 of the blockchain 110. In this exemplary implementation the relay server node 102, the cloud servers 105, the user computing entities(s) such as the entity 101 may serve as blockchain 110 peer nodes. In one embodiment, local data from the databases 103 may be encrypted and the encrypted data 106 and remote data from the database 116 may be duplicated on the blockchain ledger 109 for higher security of storage.

In one embodiment, the system 100' provides for searchable encryption—i.e., the encrypted database 106 may be searched without decryption of any stored records. The encryption methods provided herein allow to build homomorphic index which can be used in the databases 106 for indexing ciphertexts. This may allow to significantly speed up the general database 106 performance and in addition allows to search over encrypted data.

In one embodiment, verifiable encryption and ZKP (Zero Knowledge Proofs) may be implemented with the disclosed homomorphic encryption schema that allows to generate a proof of the computation correctness. In one embodiment, proprietary algorithm may be used that is based on constructing a correctness proof based on noncommutative matrix Rings $M_2(\mathbb{Z}_n)$.

Figure 10:
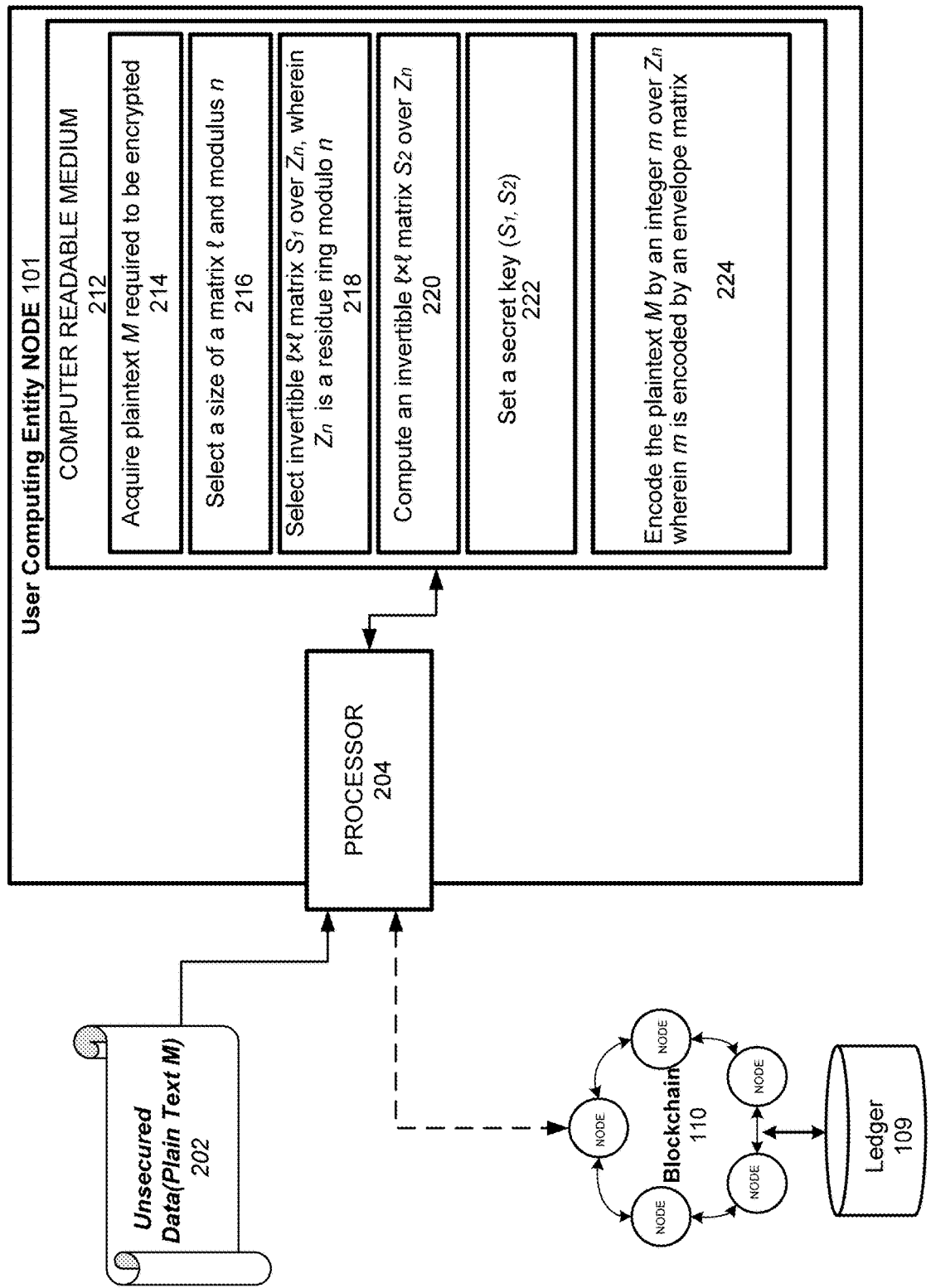
FIG. 10 illustrates a network diagram of a system including detailed features of a user computing entity node hosting a homomorphic encryption module consistent with the present disclosure.

FIG. 10 illustrates a network diagram of a system including detailed features of a user computing entity node consistent with the present disclosure.

Referring to FIG. 10, the example network includes the user computing entity node 101 configured to host a homomorphic encryption module 104 (see FIGS. 9A-B). As discussed above with respect to FIGS. 9A-B, the user computing entity node 101 may receive user's unsecured data (plain text data) data 202.

The user computing entity node 101 may process the data via the homomorphic encryption module 104 to generate the encrypted data that may be distribute dover network based on need. In one embodiment, the encrypted data 202 may be recorded on ledger 109 of the blockchain 110.

While this example describes in detail only one user computing entity node 101, multiple such nodes may be connected to the network and to the blockchain 110. It should be understood that the user computing entity node 101 may include additional components and that some of the components described herein may be removed and/or modified without departing from a scope of the user computing entity node 101 disclosed herein. The user computing entity node 101 may be a computing device or a server computer, or the like, and may include a processor 204, which may be a semiconductor-based microprocessor, a central processing unit (CPU), an application specific integrated circuit (ASIC), a field-programmable gate array (FPGA), and/or another hardware device. Although a single processor 204 is depicted, it should be understood that the user computing entity node 101 may include multiple processors, multiple cores, or the like, without departing from the scope of the FIC user computing entity node 101 system.

The user computing entity node 101 may also include a non-transitory computer readable medium 212 that may have stored thereon machine-readable instructions executable by the processor 204. Examples of the machine-readable instructions are shown as 214-224 and are further discussed below. Examples of the non-transitory computer readable medium 212 may include an electronic, magnetic, optical, or other physical storage device that contains or stores executable instructions. For example, the non-transitory computer readable medium 212 may be a Random-Access memory (RAM), an Electrically Erasable Programmable Read-Only Memory (EEPROM), a hard disk, an optical disc, or other type of storage device.

The processor 204 may fetch, decode, and execute the machine-readable instructions 214 to acquire plaintext M required to be encrypted. The processor 204 may fetch, decode, and execute the machine-readable instructions 216 to select a size of a matrix e and modulus n. The processor 204 may fetch, decode, and execute the machine-readable instructions 218 to select invertible $\ell \times \ell$ matrix $S_1$ over $\mathbb{Z}_n$, wherein $\mathbb{Z}_n$ is a residue ring modulo n. The processor 204 may fetch, decode, and execute the machine-readable instructions 220 to compute an invertible $\ell \times \ell$ matrix $S_2$ over $\mathbb{Z}_n$.

The processor 204 may fetch, decode, and execute the machine-readable instructions 222 to set a secret key ($S_1$, $S_2$). The processor 204 may fetch, decode, and execute the machine-readable instructions 224 to encode the plaintext M by an integer m over $\mathbb{Z}_n$, wherein m is encoded by an envelope matrix comprising a form $$V(m) = \begin{pmatrix} \alpha & 0 \\ \beta & m \end{pmatrix},$$

wherein $\alpha$ and $\beta$ are numbers chosen at random $\alpha, \beta \in \mathbb{Z}_n$.

As a non-limiting example, the consensual approval of the transactions may be associated with recording of the encrypted data on the blockchain 110. The permissioned blockchain 110 may be configured to use one or more smart contracts that manage transactions for multiple participating nodes and for recording the transactions on the ledger 109.

As discussed above, the system in accordance with the disclosed embodiments may execute homomorphic operations over encrypted data (without decryption).

Homomorphic Addition

In order to compute ciphertext $C(m_1+m_2)$ for given ciphertext $C(m_1)$ and $C(m_2)$ of plaintexts $m_1$ and $m_2$ the following is performed.

For $$C(m_1) = S_2 V(m_1) S_1, \quad V(m_1) = \begin{pmatrix} \alpha & 0 \\ \beta & m_1 \end{pmatrix}$$

where:
$m_1$—plaintext, V—envelop matrix, $S_1, S_2$—two matrices as a secret key, C—ciphertext, $\alpha, \beta$—random numbers.

For $$C(m_2) = S_2 V(m_2) S_1, \quad V(m_2) = \begin{pmatrix} \gamma & 0 \\ \mu & m_2 \end{pmatrix}$$

where:
$m_2$—plaintext, V—envelop matrix, $S_1, S_2$—two matrices as a secret key, C—ciphertext, $\gamma, \mu$—random numbers.

The system computes:

$$C(m_1)+C(m_2)=(S_2 V(m_1)S_1)+(S_2 V(m_2)S_1)=$$

$$=S_2(V(m_1)+V(m_2))S_1=S_2 V(m_1+m_2)S_1=C(m_1+m_2),$$
because $$V(m_1) + V(m_2) = \begin{pmatrix} \alpha & 0 \\ \beta & m_1 \end{pmatrix} + \begin{pmatrix} \gamma & 0 \\ \mu & m_2 \end{pmatrix} = \begin{pmatrix} \alpha+\gamma & 0 \\ \beta+\mu & m_1+m_2 \end{pmatrix} = V(m_1+m_2),$$

Where:
$m_1, m_2$—plaintext, V—envelop matrix, $S_1, S_2$—two matrices as a secret key, C—ciphertext, $\alpha, \beta, \gamma, \mu$—random numbers.

Homomorphic Subtraction.

The system computes ciphertext $C(m_1-m_2)$ for given ciphertext $C(m_1)$ and $C(m_2)$ of plaintexts $m_1$ and $m_2$. For $$C(m_1) = S_2 V(m_1) S_1, \quad V(m_1) = \begin{pmatrix} \alpha & 0 \\ \beta & m_1 \end{pmatrix},$$

where:
$m_1$—plaintext, V—envelop matrix, $S_1, S_2$—two matrices as a secret key, C—ciphertext, $\alpha, \beta$—random numbers.

$$C(m_2) = S_2 V(m_2) S_1, \quad V(m_2) = \begin{pmatrix} \gamma & 0 \\ \mu & m_2 \end{pmatrix},$$

where:
$m_2$—plaintext, V—envelop matrix, $S_1, S_2$—two matrices as a secret key, C—ciphertext, $\gamma, \mu$—random numbers.

Compute $$C(m_1)-C(m_2)=(S_2 V(m_1)S_1)-(S_2 V(m_2)S_1)=$$

$$=S_2(V(m_1)-V(m_2))S_1=S_2 V(m_1-m_2)S_1=C(m_1-m_2)$$
because $$V(m_1) - V(m_2) = \begin{pmatrix} \alpha & 0 \\ \beta & m_1 \end{pmatrix} - \begin{pmatrix} \gamma & 0 \\ \mu & m_2 \end{pmatrix} = \begin{pmatrix} \alpha-\gamma & 0 \\ \beta-\mu & m_1-m_2 \end{pmatrix} = V(m_1-m_2),$$

where:
$m_1, m_2$—plaintexts, V—envelop matrix, $S_1, S_2$—two matrices as a secret key, C—ciphertext, $\alpha, \beta, \gamma, \mu$—random numbers.

Homomorphic Multiplication

For given ciphertext $C(m_1)$ and $C(m_2)$ with associated plaintext $m_1$ and $m_2$ system needs to multiply them.

$$C(m_1) \cdot C(m_2) = (S_2 V(m_1)S_1)(S_2 V(m_2)S_1), \text{ where:}$$

$m_1, m_2$—plaintext, V—envelop matrix, $S_1, S_2$—two matrices as a secret key, C—ciphertext.

To achieve $C(m_1 m_2)$ the $S_1 S_2$ need to be removed within multiplication factors. The simplest way to achieve this is to restrict relationship between $S_1$ and $S_2$ as follows: $S_2 = S_1^{-1}$.

Then, $S_1 \cdot S_2 = I$—identity matrix, where:
$m_1, m_2$—plaintext, $S_1, S_2$—two matrices as a secret key, C—ciphertext, $\delta$—random number, $S_1^{-1}$—inverse matrix.

This scenario may be considered as a base scenario. Further, it is demonstrated that in the base scenario the disclosed encryption scheme leads to many useful features such as homomorphic index, homomorphic hash and homomorphic comparison. But trade-off between security and usability leads to increase attacks in the base scenario. To increase security and then decrees usability of our scheme, the enhanced scenario may be considered as follows: $S_2 = LS_1^{-1}$, where $$L = \begin{pmatrix} \delta & 0 \\ 0 & \delta \end{pmatrix},$$

$\delta$ is random invertible number in $\mathbb{Z}_n$ or $\mathbb{R}$ where:
V—envelop matrix, $S_1, S_2$—two matrices as a secret key, C—ciphertext, $\delta$—random number, $\mathbb{Z}_n$—residue ring modulo n, $\mathbb{R}$—field of real numbers, L—scalar matrix, $S_1^{-1}$—inverse matrix.

Below it is demonstrated that all of the above useful features remain in some modified form.

(i) Base scenario:

Compute $$C(m_1) \cdot C(m_2) = (S^{-1}V(m_1)S)(S^{-1}V(m_2)S) =$$

$$=S^{-1}V(m_1) \cdot V(m_2)S = S^{-1}V(m_1 m_2)S = C(m_1 m_2), \text{ where:}$$

$m_1, m_2$—plaintext, V—envelop matrix, $S_1, S_2$—two matrices as a secret key, C—ciphertext, $\alpha, \beta, \gamma, \mu$—random numbers, S, $S^{-1}$ are literally $S_1, S_2$.

(ii) Enhanced scenario:
Consider ciphertext $C(\delta^{-2})=LS^{-1}V(\delta^{-2})S$, where define $$V(\delta^{-2}) = \begin{pmatrix} \alpha & 0 \\ \beta & \delta^{-2} \end{pmatrix}$$

and $$L = \begin{pmatrix} \delta & 0 \\ 0 & \delta \end{pmatrix},$$

where
- $\delta^{-2}$—inverse power 2 of $\delta$, V—envelop matrix, C—ciphertext, $\alpha$,/$\beta$,—random numbers, S is literally $S_1$—half of the secret key, $S_2=LS^{-1}$ is another half of secret key.

Compute $$C(m_1)C(m_2) \cdot C(\delta^{-2}) = (LS^{-1}V(m_1)S) \times$$

$$\times (LS^{-1}V(m_2)S) \times (LS^{-1}V(\delta^{-2})S) == L^3(S^{-1}V(m_1) \cdot V(m_2)V(\delta^{-2})S) =$$

$$L^3\left(S^{-1}V\left(\frac{m_1 m_2}{\delta^2}\right)S\right) = LS^{-1}\left[L^2 V\left(\frac{m_1 m_2}{\delta^2}\right)\right]S = LS^{-1}V(m_1 m_2)S = C(m_1 m_2),$$

where:
- $m_1$, $m_2$—plaintext, V—envelop matrix, C—ciphertext, S, $LS^{-1}$ are literally $S_1$,$S_2$ secret key, $L^3$—scalar matrix power 3, $\delta^{-2}$—inverse power 2 of $\delta$, $L^2$—scalar matrix power 2.

Therefore, in the enhanced scenario to perform homomorphic multiplication the matrix multiplication was in focus in order to somewhat decrease performance.

Homomorphic Division (i) Base scenario. The goal is to achieve ciphertext:

$$C\left(\frac{1}{m}\right)$$

for given ciphertext C(m), where $C(m)=S^{-1}V(m)S$ compute $[C(m)]^{-1}=S^{-1}(V(m))^{-1}S$ $$(V(m))^{-1} = \begin{pmatrix} \alpha & 0 \\ \beta & m \end{pmatrix}^{-1} = \begin{pmatrix} \frac{1}{\alpha} & 0 \\ -\frac{\beta}{\alpha m} & \frac{1}{m} \end{pmatrix} V\left(\frac{1}{m}\right).$$

Compute $$(C(m))^{-1} = S^{-1}V\left(\frac{1}{m}\right)S = C\left(\frac{1}{m}\right)$$

where:
- m—plaintext, $V(m)^{-1}$—inverse envelop matrix, V—envelop matrix, C—ciphertext, $\alpha$,$\beta$—random numbers, S, $S^{-1}$ are literally $S_1$,$S_2$ secret key.

(ii) Enhanced scenario
Define $$V(\delta) = \begin{pmatrix} \alpha & 0 \\ \beta & \delta \end{pmatrix}$$

then $C(\delta)=LS^{-1}V(\delta)S$ end $$L = \begin{pmatrix} \delta & 0 \\ 0 & \delta \end{pmatrix},$$

where:
- V—envelop matrix, C—ciphertext, S, $LS^{-1}$ are literally $S_1$,$S_2$ secret key, $\alpha$, $\beta$, $\delta$—random numbers.

Compute $$(C(m))^{-1} \cdot C(\delta) = \left(L^{-1}S^{-1}V\left(\frac{1}{m}\right)S\right)(LS^{-1}V(\delta)S) =$$

$$= S^{-1}V\left(\frac{1}{m}\right) \cdot L \cdot \begin{pmatrix} \frac{1}{\delta} & 0 \\ 0 & \frac{1}{\delta} \end{pmatrix} \begin{pmatrix} \frac{1}{\alpha} & 0 \\ \frac{\beta}{\alpha m} & \frac{1}{m} \end{pmatrix} \begin{pmatrix} \alpha & 0 \\ \beta & \delta \end{pmatrix} S = LS^{-1}\begin{pmatrix} * & 0 \\ ** & \frac{1}{m} \end{pmatrix}S = C\left(\frac{1}{m}\right),$$

where:
- m—plaintext, V—envelop matrix, C—ciphertext, S, $LS^{-1}$ are literally $S_1$,$S_2$, $\alpha$,$\beta$, $\delta$—random numbers, $L^{-1}$—inverse matrix, *—neglectable result of multiplications in the current scope.

The system may homomorphically compute inverse for m by price of multiplying one matrix, which gives somewhat decreased performance.

According to one disclosed embodiment a homomorphic index may be implemented as follows. The disclosed encryption scheme has such useful feature as Hom Ind (Homomorphic Index), which gives possibility to search over ciphertexts based on the property providing that if two encrypted records have the same Hom Ind, then corresponding plaintexts are equal.

Let ciphertext $$C(m) = \begin{pmatrix} C_0 & C_1 \\ C_2 & C_3 \end{pmatrix},$$

then determinant $\det[C(m)]=C_0 C_3 - C_1 C_2$.

On the other hand, $C(m)=S_2 V(m)S_1$, then $\det[C(m)]=\det(S_2) \cdot \det(V(m)) \cdot \det(S_1)$.

(i) Base scenario $C(m)=S^{-1}V(m)S$ then $\det[C(m)]=\det(S^{-1}) \cdot \det(S) \cdot \det V(m)$ $$V(m) = \begin{pmatrix} \alpha & 0 \\ \beta & m \end{pmatrix} \Rightarrow \det(V(m)) = \alpha m, \text{ then } \det[C(m)] = \alpha m,$$

where:
- m—plaintext, C—ciphertext, $C_0$, $C_1$, $C_2$, $C_3$—elements of matrix ciphertexts, det—determinant of a matrix, V—envelop matrix, $S_1$, $S_2$—two matrices as a secret key, S,$S^{-1}$ are literally $S_1$,$S_2$, $\alpha$—random number.

Define for plaintext m

Hom Ind($m$)=det[$C(m)$].

Let under encryption of dataset random number $\alpha$ in $V(m)$ be fixed invertible for all plaintexts m from this dataset. Suppose for plaintexts $m_1$ and $m_2$:

Hom Ind($m_1$)=Hom Ind($m_2$).

Because Hom Ind (m)=det(C(m))=$\alpha$m then we have $\alpha m_1 = \alpha m_2$. Because $\alpha$ is invertible number, then $m_1 = m_2$, where:
- m—plaintext, C—ciphertext, det—determinant of a matrix, V—envelop matrix, $\alpha$—random number.

(ii) Enhanced scenario.

Let Hom Ind($m_1$)=Hom Ind($m_2$).

Hom Ind($m_1$)=det($C(m_1)$)=det[$LS^{-1}V(m_1)S$]=$\delta^2 \cdot \alpha m_1$.

Analogously, Hom Ind($m_2$)=$\delta^2 \alpha m_2$.

If Hom Ind($m_1$)=Hom Ind($m_2$), then $\delta^2 \alpha \cdot m_1 = \delta^2 \alpha m_2$ and due to $\alpha$ and $\delta$ are invertible numbers, we have $m_1 = m_2$, where:
- m, $m_1$, $m_2$—plaintexts, C—ciphertexts, det—determinant of a matrix, V—envelop matrix, $S,S^{-1}$ are literally $S_1,S_2$, and $\alpha$, $\delta,\delta^2$—random numbers, L—scalar matrix.

Homomorphic Comparison

Let $C(m_1)$ and $C(m_2)$ be ciphertexts of plaintexts $m_1$ and $m_2$ correspondingly. For $C(m_1)=S_2V(m)S_1$ and $C(m_2)=S_2V(m_2)S_1$, where:
- $m_1$, $m_2$—plaintexts, C—ciphertexts, V—envelop matrix, $S_1,S_2$—secret keys the system needs to check (without decryption) that the equality $m_1=m_2$ holds true.

(i) Base scenario.

$C(m_1)=S^{-1}V(m_1)S$, $C(m_2)=S^{-1}V(m_2)S$, $$V(m_1) = \begin{pmatrix} \alpha & 0 \\ \beta & m_1 \end{pmatrix}, V(m_2) = \begin{pmatrix} \gamma & 0 \\ \mu & m_2 \end{pmatrix}.$$

Compute $$C(m_1) - C(m_2) = S^{-1}\begin{pmatrix} \alpha-\gamma & 0 \\ \beta-\mu & m_1-m_2 \end{pmatrix}S.$$

At the one hand, $$C(m_1) - C(m_2) = C(m_1-m_2) = \begin{pmatrix} C_0 & C_1 \\ C_2 & C_3 \end{pmatrix}.$$

where: $m_1,m_2$—plaintexts, C—ciphertext, $C_0$, $C_1$, $C_2$, $C_3$—elements, V—envelop matrix, $S,S^{-1}$ are literally $S_1,S_2$ secret keys, $\alpha,\beta,\gamma,\mu$—random numbers.

Compute: $\Delta$=det[$C(m_1-m_2)$]=$C_0C_3-C_1C_2$.

On the other hand, $C(m_1-m_2)=S^{-1}V(m_1-m_2)S$.

Then det[$C(m_1-m_2)$]=det($S$)·det($S^{-1}$)·$(\alpha-\gamma)(m_1-m_2)$=$(\alpha-\gamma)(m_1-m_2)$, where:
- $m_1$, $m_2$—plaintexts, m—plaintext, C—ciphertext, $C_0$, $C_1$, $C_2$, $C_3$—elements, det—determinant of a matrix, V—envelop matrix, $S,S^{-1}$ are literally $S_1,S_2$ secret keys, $\alpha$, $\beta,\gamma,\mu$,—random numbers, $\Delta$—value of determinant.

Because random numbers $\alpha$ and $\gamma$ are chosen independently, $\alpha-\gamma \neq 0$ with overwhelming probability. Also, $\Delta=(\alpha-\gamma)(m_1-m_2)$, then $$m_1 - m_2 = \frac{\Delta}{\alpha - \gamma}$$

with overwhelming probability.

Where: $m_1$, $m_2$—plaintexts, $\alpha$, $\gamma$,—random numbers, $\Delta$—value of determinant.

Therefore:

$$\Delta = 0 \Leftrightarrow m_1 = m_2; \tag{a}$$

$$\frac{\Delta}{\alpha - \gamma} \rangle 0 \Leftrightarrow m_1 \rangle m_2; \tag{b}$$

$$\frac{\Delta}{\alpha - \gamma} \langle 0 \Leftrightarrow m_1 \langle m_2. \tag{c}$$

Where: $m_1$, $m_2$—plaintext, $\alpha,\gamma$,—random numbers, $\Delta$—value of determinant.

Note that is, as assumed above, $\alpha$ is a fixed random number in $V(m_1)$ and $V(m_2)$, then $\alpha-\gamma=0$ and (a)-(c) do not hold.

(i) Enhanced scenario.

$C(m_1)=LS^{-1}V(m_1)S$ $C(m_2)=LS^{-1}V(m_2)S$ $$C(m_1) - C(m_2) = LS^{-1}V(m_1-m_2)S = \begin{pmatrix} C_0 & C_1 \\ C_2 & C_3 \end{pmatrix}$$

det($C(m_1-m_2)$)=$\Delta$=$C_0C_3-C_1C_2$.

Where: det—determinant, $m_1,m_2$—plaintext, C—ciphertext, $C_0$, $C_1$, $C_2$, $C_3$-elements, det—determinant of a matrix, V—envelop matrix, S, $LS^{-1}$ are literally $S_1$, $S_2$ secret keys, L—scalar matrix, $\Delta$—value of determinant.

On the other hand, we have $\Delta$=(det$L$)det($S^{-1}$)det($S$)$(\alpha-\gamma)(m_1-m_2)$=$\delta^2(\alpha-\gamma)(m_1-m_2)$.

Where: det—determinant, $m_1,m_2$—plaintext, det—determinant of a matrix, S, $LS^{-1}$ are literally $S_1,S_2$ secret keys, $\alpha$, $\gamma$,—random numbers, $\Delta$—value of determinant, $\delta^2$—random num power 2, L—scalar matrix.

As above, $\alpha-\gamma \neq 0$ with overwhelming probability. Therefore, $$m_1 - m_2 = \frac{\Delta}{\delta^2(\alpha - \gamma)}.$$

$$\Delta = 0 \Leftrightarrow m_1 = m_2; \tag{a}$$

$$\frac{\Delta}{\delta^2(\alpha - \gamma)} \rangle 0 \Leftrightarrow m_1 \rangle m_2; \tag{b}$$

-continued $$\frac{\Delta}{\delta^2(\alpha-\gamma)}\langle 0 \Leftrightarrow m_1 \langle m_2. \quad (c)$$

Where: $m_1$, $m_2$—plaintext, det—determinant of a matrix, S, $LS^{-1}$ are literally $S_1, S_2$ secret keys, $\alpha, \gamma$,—random numbers, $\Delta$—value of determinant, $\delta^2$—random num power 2.

Second solution. Assume $\alpha=\gamma$ here.

(i) Base scenario, compute:

$$\frac{C(m_1)}{C(m_2)} = C(m_1) \cdot [C(m_2)]^{-1} =$$

$$\begin{pmatrix} C_0 & C_1 \\ C_2 & C_3 \end{pmatrix} = (S^{-1}V(m_1)S) \cdot \left(S^{-1}V\left(\frac{1}{m_2}\right)S\right) = S^{-1}V\left(\frac{m_1}{m_2}\right)S = C\left(\frac{m_1}{m_2}\right),$$

where $$V(m_1) = \begin{pmatrix} \alpha & 0 \\ \beta & m_1 \end{pmatrix}, V(m_2) = \begin{pmatrix} \alpha & 0 \\ \mu & m_2 \end{pmatrix},$$

$$V\left(\frac{1}{m_2}\right) = (V(m_2))^{-1} = \begin{pmatrix} \frac{1}{\alpha} & 0 \\ \frac{-\mu}{m_2} & \frac{1}{m_2} \end{pmatrix},$$

$$\nabla = \det\left(\frac{C(m_1)}{C(m_2)}\right) = \det\left[C\left(\frac{m_1}{m_2}\right)\right] = C_0C_3 - C_1C_2.$$

Where: $m_1$, $m_2$—plaintext, C—ciphertext, $C_0$, $C_1$, $C_2$, $C_3$—elements of matrix ciphertext, det—determinant of a matrix, V—envelop matrix, $S, S^{-1}$ are literally $S_1$, $S_2$ secret keys, $\alpha$, $\beta$, $\gamma$,—random numbers, $\nabla$-value of determinant.

On the other hand, $$\nabla = \det(V(m_1)) \cdot \det\left(V\left(\frac{1}{m_2}\right)\right) = \alpha m_1 \cdot \frac{1}{\alpha m_2} = \frac{m_1}{m_2}.$$

$$\nabla = \frac{m_1}{m_2}.$$

$\nabla=1 \Leftrightarrow m_1=m_2;$ (a)

$\nabla \rangle 1 \Leftrightarrow m_1 \rangle m_2;$ (b)

$\nabla \langle 1 \Leftrightarrow m_1 \langle m_2.$ (c)

Where: $m_1$, $m_2$—plaintext, det—determinant of a matrix, V—envelop matrix, $\alpha, \gamma$—random number, $\nabla$—value of determinant.

(ii) Enhanced scenario, second solution:

For given ciphertexts $C(m_1)$ and $C(m_2)$ we want computing ciphertext $$C\left(\frac{m_1}{m_2}\right).$$

We have $C(m_1)=LS^{-1}V(m_1)S, \; C(m_2)=LS^{-1}V(m_2)S.$

Compute $$C\left(\frac{1}{m_2}\right) = [C(m_2)]^{-1} \cdot C(\delta) = \left(S^{-1}V\left(\frac{1}{m_2}\right)S \cdot L^{-1}\right) \cdot (LS^{-1}V(\delta)S)$$

$$C(m_1) \cdot C\left(\frac{1}{m_2}\right) \cdot C(\delta^{-2}) = C\left(\frac{m_1}{m_2}\right) = \begin{pmatrix} C_0 & C_1 \\ C_2 & C_3 \end{pmatrix}.$$

Denote $$\nabla = \det\left(C\left(\frac{m_1}{m_2}\right)\right).$$

$\nabla = C_0C_3 - C_1C_2.$

Where: $m_1$, $m_2$—plaintext, C—ciphertext, $C_0$, $C_1$, $C_2$, $C_3$—elements of matrix ciphertexts, det—determinant of a matrix, V—envelop matrix, S, $LS^{-1}$ are literally $S_1, S_2$ secret keys, $\nabla$—value of determinant, $\delta$—random number, $\delta^{-2}$—inverse of power two of $\delta$, L—scalar matrix, $L^{-1}$ inverse of scalar matrix, $\delta$—random number.

On the other hand, $$\nabla = \det[C(m_1)] \cdot \det\left[C\left(\frac{1}{m_2}\right)\right] \cdot \det[C(\delta^{-2})] \cdot \det[C(\delta)] \det[C(m_1)] =$$

$$\det L \cdot \det(V(m_1)) = \delta^2 \cdot \alpha m_1.$$

$$\det\left[C\left(\frac{1}{m_2}\right)\right] = \det[C(m_2)^{-1}] \cdot \det(C(\delta)) =$$

$$= (\det L)^{-1} \cdot \det\left(V\left(\frac{1}{m_2}\right)\right) = \delta^{-2} \cdot \frac{1}{\alpha m_2},$$

$$\det[C(\delta^{-2})] = \det(L) \cdot \det[V(\delta^{-2})] = \delta^2 \cdot \alpha \cdot \delta^{-2} = \alpha,$$

$$\det C(\delta) = \delta^2 \cdot \alpha \delta = \delta^3 \alpha.$$

Where: $m_1$, $m_2$—plaintext, C—ciphertext, det—determinant, V—envelop matrix, $\delta$, $\alpha$,—random numbers, $\nabla$—value of determinant, $\delta$—random number, $\delta^{-2}$—inverse of power two of $\delta$, L—scalar matrix.

Therefore, $$\nabla = (\delta^2 \cdot \alpha m_1) \cdot \left(\delta^{-2} \frac{1}{\alpha m_2}\right) \cdot (\delta^3 \alpha) \cdot \alpha = \frac{m_1}{m_2} \cdot \alpha^2 \delta^3$$

Then $\frac{m_1}{m_2} = \frac{\nabla}{\alpha^2 \delta^3}.$

We have the following possibilities:

$$\frac{\nabla}{\alpha^2 \delta^3} = 1 \Rightarrow m_1 = m_2 \quad (i)$$

$$\frac{\nabla}{\alpha^2 \delta^3} \rangle 1 \Rightarrow m_1 \rangle m_2 \quad (ii)$$

$$\frac{\nabla}{\alpha^2 \delta^3} \langle 1 \Rightarrow m_1 \langle m_2. \quad (iii)$$

Where: $m_1$, $m_2$—plaintext, $\alpha, \beta$, $\gamma, \mu$,—random numbers, $\nabla$-value of determinant, $\delta$—random number, $\delta^{-2}$—inverse of power two of $\delta$, $\alpha^2 \delta^3$—product of power two of a and power of three $\delta$.

Homomorphic Hash

In one embodiment, the homomorphic hash is implemented as follows.

The discloses scheme may homomorphically perform universal hash function as encryption overall universal hash result with the proprietary cipher by computing HomHash (m) for plaintext m at initial time and at current time. If these homomorphic indices are equal, then the integrity of m holds, otherwise it does not. The system uses unique entities as keys, which are asymmetric secret keys, but in proposed terminology these are 2 service keys. The first key is for the first reference session and the second key is for the second session. None of these keys can be used to decrypt ciphertext, and the comparison operation is performing over ciphertexts only.

This feature also needed in the case when users can encrypt their plaintexts, which requires a public key (e.g., asymmetric secret key based on terminology used herein) for encryption. This new feature is described in detail below.

A hash sum based on Fully Homomorphic encryption is a fully unique type of entity suitable only for current proposed math. Fundamentals cannot be implemented based on any of traditional FHE schemes.

$h_{a,b}(x) = ((ax+b) \mod p) \mod n$, where p is prime, a and b chosen randomly modulo p.

1. Encrypt random parameters a and b by secret key S, $S^{-1}$:

$$C(a) = S^{-1}V(a)S, \; V(a) = \begin{pmatrix} \alpha & 0 \\ \beta & a \end{pmatrix} - \alpha, \beta - \text{random};$$

$$C(b) = S^{-1}V(b)S, \; V(b) = \begin{pmatrix} \gamma & 0 \\ \mu & b \end{pmatrix} - \gamma, \mu - \text{random}.$$

Where, $h_{a,b}(x)$=universal hash function, $m_1$, $m_2$—plaintext, $\alpha, \beta, \gamma, \mu$,—random numbers, V—envelop matrix, $h_{a,b}$, a,b—random parameters from universal hash, S, $S^{-1}$—secret key.

2. User U encrypts by its service key P plaintext m as initial round of Hom Hash:

$$Enc_{P_U}(m) = \begin{pmatrix} C_0 & C_1 \\ C_2 & C_3 \end{pmatrix},$$

$HomHash_1(m) = C(a)Enc_{P_U}(m) + C(b)$.

Where: $Enc_{P_U}$—ciphertext after using the first service key, C, $C_0$, $C_1$, $C_2$, $C_3$—ciphertexts, m—plaintext.

3. To perform second round of Hom Hash, user is given new(another) service key $Q_U$ and encrypts by him current plaintext m':

$$Enc_{Q_U}(m') = \begin{pmatrix} C'_0 & C'_1 \\ C'_2 & C'_3 \end{pmatrix}.$$

4. Compute $Hom Hash_2(m') = C(a) \cdot Enc_{Q_U}(m') + C(b)$.

Where:

$Enc_{Q_U}$ ciphertext after using second service key, C—ciphertext, $C_0'C_1'$, $C_2'C_3'$—elements of matrix ciphertexts, m'—plaintext, a,b random parameters from universal hash function.

5. Check integrity of plaintext m by the following:
a)

$$\text{Hom Hash}_1(m) - \text{Hom Hash}_2(m') = T = \begin{pmatrix} t_0 & t_1 \\ t_2 & t_3 \end{pmatrix};$$

Compute det T=$\Delta$;
c) det T=$f(\alpha, \gamma) \cdot a \cdot (m-m')$;
d)

$$\begin{cases} \Delta = 0 \Rightarrow m = m' - \text{integrity holds} \\ \Delta \neq 0 \Rightarrow m \neq m' - \text{integrity fails}. \end{cases}$$

Where:
T—matrix of hashes difference, $t_0$, $t_1$, $t_2$, $t_3$—elements of matrix T, m, m'—plaintexts, a,b—random params from universal hash, detT—determinant of a matrix T, $f(\alpha, \gamma)$—result of intermediate computation on position (1, 1) of envelop matrix V(a(m−m')), $\Delta$—result of comparison.

Service Keys

Basic principles of the disclosed service keys are:

1) case for FHE Hash, when the system produces and stores only service session keys without a secret, where Service key 1—is for a reference session and key 2 for the second session as a comparison.

2) When the system produces both a secret key and a service key. In the second case, a single secret key might be used to generate plenty (thousands or hundreds) of service keys which can be used only for encryption, while the single secret key can decrypt like a master key.

So, secret key holder computes service key with aim that users can encrypt their data. But this encryption key is viewed as a private asymmetric user key, so it cannot be considered as a public key. Thus, is referred to as a secret service key.

To compute the service key, secret key holder does the following:

Denote matrices $S_1$ and $S_2$ as $$S = \begin{pmatrix} S_{1,0} & S_{1,1} \\ S_{1,2} & S_{1,3} \end{pmatrix}, S^{-1} = \begin{pmatrix} S_{2,0} & S_{2,1} \\ S_{2,2} & S_{2,3} \end{pmatrix}, S, S^{-1} - \text{secret key}.$$

For plaintext m let us consider enhanced scenario $$V(m) = \begin{pmatrix} \alpha & 0 \\ \beta & m \end{pmatrix}.$$

$$C(m) = LS^{-1}V(m)S, \text{ where } L = \begin{pmatrix} \delta & 0 \\ 0 & \delta \end{pmatrix}.$$

Where:
m—plaintext, $\alpha$, $\beta$—random numbers, V—envelop matrix, S, $LS^{-1}$—secret key, L—scalar matrix, $\alpha$, $\delta$, $\beta$—random number.

Service key $P=(p_0, p_1, \ldots, p_7)$ is used for encryption as follows:
for ciphertext $$c(m) = \begin{pmatrix} c_0 & c_1 \\ c_2 & c_3 \end{pmatrix}$$

we have $$c_0 = p_0 + p_1 \cdot m,$$

$$c_1 = p_2 + p_3 \cdot m,$$

$$c_2 = p_4 + p_5 \cdot m,$$

$$c_3 = p_6 + p_7 \cdot m.$$

Where:
m—plaintext, C—ciphertext, $C_0$, $C_1$, $C_2$, $C_3$—elements of matrix ciphertexts, $p_0, \ldots, p_7$—elements of service key.

Below is shown how the holder of the secret key computes service keys P for many users.

Note that random numbers $\alpha_i$ and $\beta_i$ chosen independently for different users $x_i$.

$$P_0 = \alpha_i a_0 + \beta_i b_0, \text{ where}$$

$$a_0 = \delta \cdot s_{1,0} \cdot s_{2,0}, \quad b_0 = \delta s_{2,1} \cdot s_{1,0}$$

$$P_1 = \delta s_{2,1} \cdot s_{1,2},$$

$$P_2 = \alpha_i \cdot a_2 + \beta_i b_2, \text{ where}$$

$$a_2 = \delta s_{2,0} \cdot s_{1,1}, \quad b_2 = \delta s_{2,1} \cdot s_{1,1},$$

$$P_3 = \delta s_{2,1} \cdot s_{1,3},$$

$$P_4 = \alpha_i a_4 + \beta_i b_4, \text{ where}$$

$$a_4 = \delta s_{2,2} \cdot s_{1,0}, \quad b_4 = \delta s_{2,3} \cdot s_{1,0},$$

$$P_5 = \delta s_{2,3} \cdot s_{1,2},$$

$$P_6 = \alpha d \cdot a_6 + \beta_i b_6, \text{ where}$$

$$a_6 = \delta s_{2,2} \cdot s_{1,1}, \quad b_6 = \delta s_{2,3} \cdot s_{1,1},$$

$$P_7 = \delta s_{2,3} \cdot s_{1,3}.$$

Accordingly, the disclosed embodiments provide for a unique feature—many different encryption keys and one decryption key.

The disclosed embodiments may be used for various non-limiting exemplary use cases.

1. Anti-Money Laundering (AML) very specific and unique cases when the auditor can look into the protected case/safe to help the government to prove that it is "clean" inside.
2. Encrypted data integrity. For example, a user encrypts his dataset by the disclosed Homomorphic Encryption scheme and placed it to cloud. To achieve integrity of this encrypted data, homomorphic hash feature of the disclosed scheme may be used.
3. Virtual machines static protection (integrity). The VM integrity may be protected by generating FHE hash during power down and then power up. Comparison of two hash sums will be implemented homomorphically, meaning with no opening of plaintext hash.
4. Statistical computations over encrypted data. When a user placed encrypted dataset to cloud (see Use case 1), he may perform various statistical computations over this data. Note that in these computations often use arithmetic operation of division, which does not exist in existing FHE libraries (i.e., HElib, SEAL and other libraries do not support division). Moreover, high-depth circuits which arise in statistical computations are expensive for existing FHE, but very inexpensive for the disclosed scheme.
5. Outsourced encrypted data. Encrypted dataset in use cases 1 and 2 can be outsourced to perform various computations, in particular, statistical computations.
6. Search over encrypted data. In all of the above use cases, a user has an opportunity to search over encrypted data using such feature of the disclosed encryption scheme as a homomorphic index. Consider a setting when on site of some organization needs to verify user before onboarding, but the user may not want to reveal his identity. In this case, when someone wants to have access to organization's data, he/she inputs their full name and after encryption obtained ciphertext is compared with an access list for homomorphic equality, the access is allowed.
7. In one embodiment, a homomorphic audit may be implemented as follows. Consider a setting when sensitive data of organization is encrypted using the disclosed encryption scheme. Also, some public data is encrypted for easy comparison. The auditor can homomorphically compute over encrypted data and perform various comparisons with them.
8. Consider a manager-employees relationship with using the disclosed encryption scheme. Let a manager be a holder of a secret key. Then, the manager computes different service keys for employees, which have to make their business computations by using the service keys. Finally, the manager compares encrypted results via homomorphic comparisons and decrypts few of them for further analysis.
9. A unique blockchain FHE-based may be implemented with high performance capable of performing computations from other math domains, for instance such as elliptic curves and perform these operations in the disclosed scheme domain.

According to the disclosed embodiments, several unique features are provided as follows.

Non-deterministic encryption may be implemented—the ciphertext generated multiple times for the same plaintext will always be different;

Revolutionary speed of the disclosed scheme—this speed surpasses any existing analogs by several orders of magnitude, making FHE practical for the first time, while maintaining the high level of security without compromises;

Fixed ciphertext expansion;

Complete absence of complex, expensive, and very slow operations such as bootstrapping, relinearization, noise, key switching, modulo switching. etc.;

Ability to perform homomorphic division, which is fundamentally absent in any current FHE libraries;

Unique scheme allowing hybrid functionality (both symmetric and asymmetric) and additionally generating special service keys for homomorphic hashing;

Ability to work within the same scheme with both floating points and integers and to perform all four basic arithmetic operations (addition, subtraction, multiplication, and division), which no existing scheme can do;

Ability to compare homomorphically encrypted plaintexts without revealing data, which is also impossible with any existing FHE schemes;

Ability to generate a homomorphic index derived from the ciphertext but being a deterministic value—i.e., allowing both homomorphic search on encrypted data and creating a new, unique type of database search through unique indexing of this data using this homomorphic index;

Ability to create multi-service assymetric keys for multiple users based on one private key, so they can all encrypt data with them, but only the private key owner can decrypt it;

Ability to create multi-private keys for multiple users being able to perform FHE comparison on the encrypted data while decrypting data is possible only for each separate private key used for data generation;

Unique key switching scheme, where one private key is excluded from the scheme and replaced with another key;

Unique ability to peek at data, based on specific parameters using the homomorphic index and overall encrypted data search, which can be implemented in, for example, an AML (anti-money laundering) case;

Ability to use the disclosed scheme in databases, making them fully homomorphic and significantly enhancing their security;

Ability to perform the disclosed mathematics in conjunction with other areas such as elliptic curves, thereby creating unique blockchain schemes and the potential to build completely new, unique blockchains, tokens, and cryptocurrencies based on FHE, which is impossible with any existing schemes due to their extremely low performance;

Ability to create a completely new FHE scheme for ZKP (zero-knowledge proofs); and The new entity, such as a services keys, which can be generated to service with FHE Hash or used as a standalone sort of private keys just for encryption (with no decryption capabilities).

The disclosed ecosystem/engine has no analogs globally, neither in essence, nor in performance (by several orders of magnitude), nor in functionality, which is unique to the ecosystem/engine. For example, as discussed above, homomorphic division, comparison, hash, indexing and multi-key generation are properties exclusive to the disclosed FHE Crypto Engine.

As discussed above, in one embodiment, the features and/or the actions described and/or depicted herein can occur on or with respect to the blockchain 110. The above embodiments of the present disclosure may be implemented in hardware, in computer-readable instructions executed by a processor, in firmware, or in a combination of the above. The computer computer-readable instructions may be embodied on a computer-readable medium, such as a storage medium. For example, the computer computer-readable instructions may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative embodiment, the processor and the storage medium may reside as discrete components. For example, FIG. 11 illustrates an example computing device (e.g., a server node) 500, which may represent or be integrated in any of the above-described components, etc.

Figure 11:
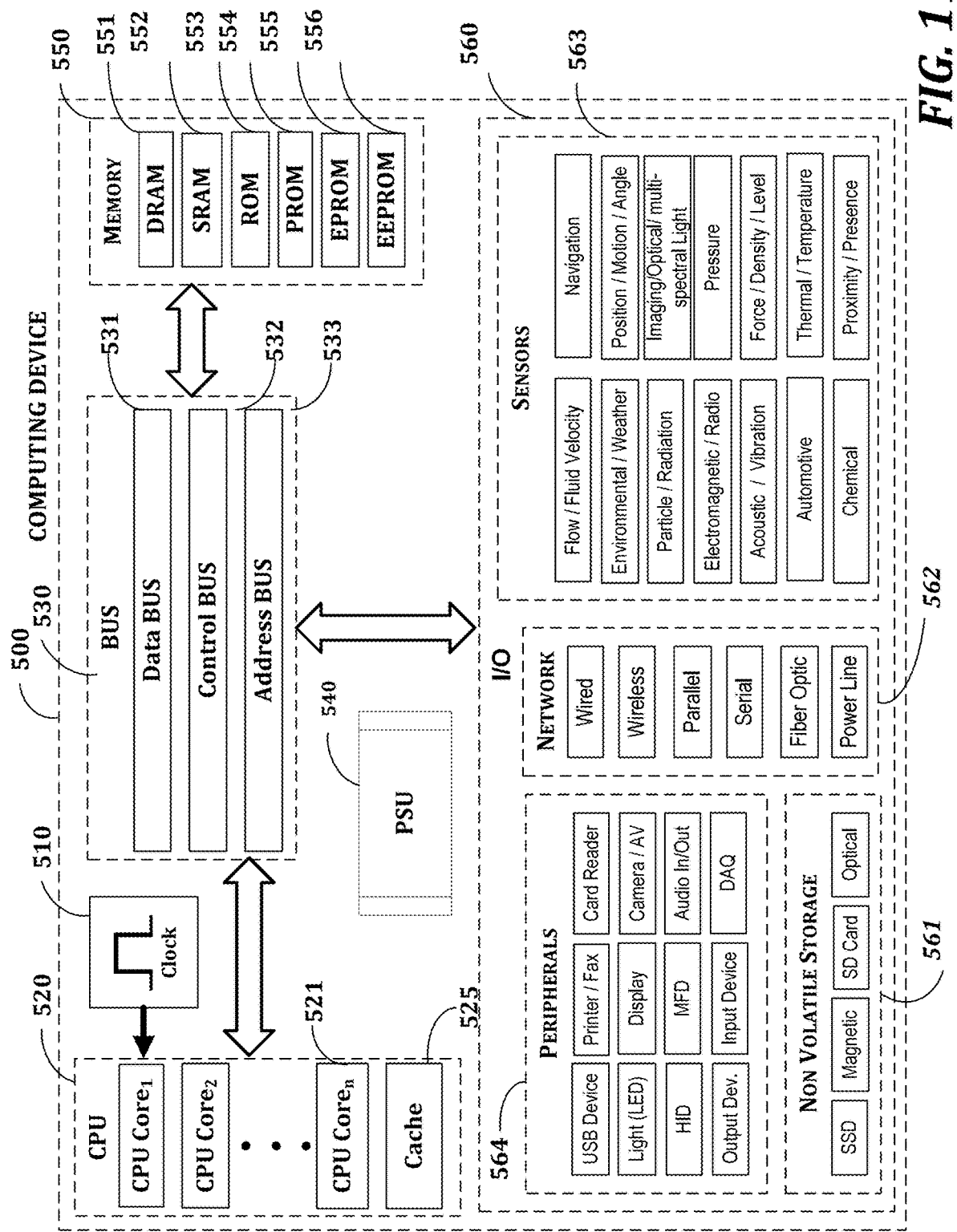
FIG. 11 illustrates a block diagram of a system including a computing device for performing the homomorphic encryption methods described herein.

FIG. 11 illustrates a block diagram of a system including computing device 500. The computing device 500 may comprise, but not be limited to the following:

Mobile computing device, such as, but is not limited to, a laptop, a tablet, a smartphone, a drone, a wearable, an embedded device, a handheld device, an Arduino, an industrial device, or a remotely operable recording device;

A supercomputer, an exa-scale supercomputer, a mainframe, or a quantum computer;

A minicomputer, wherein the minicomputer computing device comprises, but is not limited to, an IBM AS500/iSeries/System I, A DEC VAX/PDP, a HP3000, a Honeywell-Bull DPS, a Texas Instruments TI-990, or a Wang Laboratories VS Series;

A microcomputer, wherein the microcomputer computing device comprises, but is not limited to, a server, wherein a server may be rack mounted, a workstation, an industrial device, a raspberry pi, a desktop, or an embedded device;

The user computing node 101 (see FIG. 2) may be hosted on a centralized server or on a cloud computing service. Although method 300 has been described to be performed by the user computing node 101 implemented on a computing device 500, it should be understood that, in some embodiments, different operations may be performed by a plurality of the computing devices 500 in operative communication at least one network.

Embodiments of the present disclosure may comprise a computing device having a central processing unit (CPU) 520, a bus 530, a memory unit 550, a power supply unit (PSU) 550, and one or more Input/Output (I/O) units. The CPU 520 coupled to the memory unit 550 and the plurality of I/O units 560 via the bus 530, all of which are powered by the PSU 550. It should be understood that, in some embodiments, each disclosed unit may actually be a plurality of such units for the purposes of redundancy, high availability, and/or performance. The combination of the presently disclosed units is configured to perform the stages of any method disclosed herein.

Consistent with an embodiment of the disclosure, the aforementioned CPU 520, the bus 530, the memory unit 550, a PSU 550, and the plurality of I/O units 560 may be implemented in a computing device, such as computing device 500. Any suitable combination of hardware, software, or firmware may be used to implement the aforementioned units. For example, the CPU 520, the bus 530, and the memory unit 550 may be implemented with computing device 500 or any of other computing devices 500, in combination with computing device 500. The aforementioned system, device, and components are examples and other systems, devices, and components may comprise the aforementioned CPU 520, the bus 530, the memory unit 550, consistent with embodiments of the disclosure.

At least one computing device 500 may be embodied as any of the computing elements illustrated in all of the attached figures, including the user computing node 101 (FIG. 2). A computing device 500 does not need to be electronic, nor even have a CPU 520, nor bus 530, nor memory unit 550. The definition of the computing device 500 to a person having ordinary skill in the art is "A device that computes, especially a programmable [usually] electronic machine that performs high-speed mathematical or logical operations or that assembles, stores, correlates, or otherwise processes information." Any device which processes information qualifies as a computing device 500, especially if the processing is purposeful.

With reference to FIG. 11, a system consistent with an embodiment of the disclosure may include a computing device, such as computing device 500. In a basic configuration, computing device 500 may include at least one clock module 510, at least one CPU 520, at least one bus 530, and at least one memory unit 550, at least one PSU 550, and at least one I/O 560 module, wherein I/O module may be comprised of, but not limited to a non-volatile storage sub-module 561, a communication sub-module 562, a sensors sub-module 563, and a peripherals sub-module 565.

A system consistent with an embodiment of the disclosure the computing device 500 may include the clock module 510 may be known to a person having ordinary skill in the art as a clock generator, which produces clock signals. Clock signal is a particular type of signal that oscillates between a high and a low state and is used like a metronome to coordinate actions of digital circuits. Most integrated circuits (ICs) of sufficient complexity use a clock signal in order to synchronize different parts of the circuit, cycling at a rate slower than the worst-case internal propagation delays. The preeminent example of the aforementioned integrated circuit is the CPU 520, the central component of modern computers, which relies on a clock. The only exceptions are asynchronous circuits such as asynchronous CPUs. The clock 510 can comprise a plurality of embodiments, such as, but not limited to, single-phase clock which transmits all clock signals on effectively 1 wire, two-phase clock which distributes clock signals on two wires, each with non-overlapping pulses, and four-phase clock which distributes clock signals on 5 wires.

Many computing devices 500 use a "clock multiplier" which multiplies a lower frequency external clock to the appropriate clock rate of the CPU 520. This allows the CPU 520 to operate at a much higher frequency than the rest of the computer, which affords performance gains in situations where the CPU 520 does not need to wait on an external factor (like memory 550 or input/output 560). Some embodiments of the clock 510 may include dynamic frequency change, where the time between clock edges can vary widely from one edge to the next and back again.

A system consistent with an embodiment of the disclosure the computing device 500 may include the CPU unit 520 comprising at least one CPU Core 521. A plurality of CPU cores 521 may comprise identical CPU cores 521, such as, but not limited to, homogeneous multi-core systems. It is also possible for the plurality of CPU cores 521 to comprise different CPU cores 521, such as, but not limited to, heterogeneous multi-core systems, big.LITTLE systems and some AMD accelerated processing units (APU). The CPU unit 520 reads and executes program instructions which may be used across many application domains, for example, but not limited to, general purpose computing, embedded computing, network computing, digital signal processing (DSP), and graphics processing (GPU). The CPU unit 520 may run multiple instructions on separate CPU cores 521 at the same time. The CPU unit 520 may be integrated into at least one of a single integrated circuit die and multiple dies in a single chip package. The single integrated circuit die and multiple dies in a single chip package may contain a plurality of other aspects of the computing device 500, for example, but not limited to, the clock 510, the CPU 520, the bus 530, the memory 550, and I/O 560.

The CPU unit 520 may contain cache 522 such as, but not limited to, a level 1 cache, level 2 cache, level 3 cache or combination thereof. The aforementioned cache 522 may or may not be shared amongst a plurality of CPU cores 521. The cache 522 sharing comprises at least one of message passing and inter-core communication methods may be used for the at least one CPU Core 521 to communicate with the cache 522. The inter-core communication methods may comprise, but not limited to, bus, ring, two-dimensional mesh, and crossbar. The aforementioned CPU unit 520 may employ symmetric multiprocessing (SMP) design.

The plurality of the aforementioned CPU cores 521 may comprise soft microprocessor cores on a single field programmable gate array (FPGA), such as semiconductor intellectual property cores (IP Core). The plurality of CPU cores 521 architecture may be based on at least one of, but not limited to, Complex instruction set computing (CISC), Zero instruction set computing (ZISC), and Reduced instruction set computing (RISC). At least one of the performance-enhancing methods may be employed by the plurality of the CPU cores 521, for example, but not limited to Instruction-level parallelism (ILP) such as, but not limited to, superscalar pipelining, and Thread-level parallelism (TLP).

Consistent with the embodiments of the present disclosure, the aforementioned computing device 500 may employ a communication system that transfers data between components inside the aforementioned computing device 500, and/or the plurality of computing devices 500. The aforementioned communication system will be known to a person having ordinary skill in the art as a bus 530. The bus 530 may embody internal and/or external plurality of hardware and software components, for example, but not limited to a wire, optical fiber, communication protocols, and any physical arrangement that provides the same logical function as a parallel electrical bus. The bus 530 may comprise at least one of, but not limited to a parallel bus, wherein the parallel bus carry data words in parallel on multiple wires, and a serial bus, wherein the serial bus carry data in bit-serial form. The bus 530 may embody a plurality of topologies, for example, but not limited to, a multidrop/electrical parallel topology, a daisy chain topology, and a connected by switched hubs, such as USB bus. The bus 530 may comprise a plurality of embodiments, for example, but not limited to:

Internal data bus (data bus) 531/Memory bus
Control bus 532
Address bus 533
System Management Bus (SMBus)
Front-Side-Bus (FSB)
External Bus Interface (EBI)
Local bus
Expansion bus
Lightning bus
Controller Area Network (CAN bus)
Camera Link
ExpressCard
Advanced Technology management Attachment (ATA), including embodiments and derivatives such as, but not limited to, Integrated Drive Electronics (IDE)/Enhanced IDE (EIDE), ATA Packet Interface (ATAPI), Ultra-Direct Memory Access (UDMA), Ultra ATA (UATA)/Parallel ATA (PATA)/Serial ATA (SATA), CompactFlash (CF) interface, Consumer Electronics ATA (CE-ATA)/Fiber Attached Technology Adapted (FATA), Advanced Host Controller Interface (AHCI), SATA Express (SATAe)/External SATA (eSATA), including the powered embodiment eSATAp/Mini-SATA (mSATA), and Next Generation Form Factor (NGFF)/M.2.
Small Computer System Interface (SCSI)/Serial Attached SCSI (SAS)
HyperTransport
InfiniBand
RapidIO
Mobile Industry Processor Interface (MIPI)

Coherent Processor Interface (CAPI)
Plug-n-play
1-Wire
Peripheral Component Interconnect (PCI), including embodiments such as, but not limited to, Accelerated Graphics Port (AGP), Peripheral Component Interconnect eXtended (PCI-X), Peripheral Component Interconnect Express (PCI-e) (e.g., PCI Express Mini Card, PCI Express M.2 [Mini PCIe v2], PCI Express External Cabling [ePCIe], and PCI Express OCuLink [Optical Copper{Cu} Link]), Express Card, AdvancedTCA, AMC, Universal IO, Thunderbolt/Mini DisplayPort, Mobile PCIe (M-PCIe), U.2, and Non-Volatile Memory Express (NVMe)/Non-Volatile Memory Host Controller Interface Specification (NVMHCIS).
Industry Standard Architecture (ISA), including embodiments such as, but not limited to Extended ISA (EISA), PC/XT-bus/PC/AT-bus/PC/105 bus (e.g., PC/105-Plus, PCI/105-Express, PCI/105, and PCI-105), and Low Pin Count (LPC).
Music Instrument Digital Interface (MIDI)
Universal Serial Bus (USB), including embodiments such as, but not limited to, Media Transfer Protocol (MTP)/Mobile High-Definition Link (MHL), Device Firmware Upgrade (DFU), wireless USB, InterChip USB, IEEE 1395 Interface/Firewire, Thunderbolt, and eXtensible Host Controller Interface (xHCI).

Consistent with the embodiments of the present disclosure, the aforementioned computing device 500 may employ hardware integrated circuits that store information for immediate use in the computing device 500, known to the person having ordinary skill in the art as primary storage or memory 550. The memory 550 operates at high speed, distinguishing it from the non-volatile storage sub-module 561, which may be referred to as secondary or tertiary storage, which provides slow-to-access information but offers higher capacities at lower cost. The contents contained in memory 550, may be transferred to secondary storage via techniques such as, but not limited to, virtual memory and swap. The memory 550 may be associated with addressable semiconductor memory, such as integrated circuits consisting of silicon-based transistors, used for example as primary storage but also other purposes in the computing device 500. The memory 550 may comprise a plurality of embodiments, such as, but not limited to volatile memory, non-volatile memory, and semi-volatile memory. It should be understood by a person having ordinary skill in the art that the ensuing are non-limiting examples of the aforementioned memory:

Volatile memory which requires power to maintain stored information, for example, but not limited to, Dynamic Random-Access Memory (DRAM) 551, Static Random-Access Memory (SRAM) 552, CPU Cache memory 525, Advanced Random-Access Memory (A-RAM), and other types of primary storage such as Random-Access Memory (RAM).

Non-volatile memory which can retain stored information even after power is removed, for example, but not limited to, Read-Only Memory (ROM) 553, Programmable ROM (PROM) 555, Erasable PROM (EPROM) 555, Electrically Erasable PROM (EEPROM) 556 (e.g., flash memory and Electrically Alterable PROM [EAPROM]), Mask ROM (MROM), One Time Programmable (OTP) ROM/Write Once Read Many (WORM), Ferroelectric RAM (FeRAM), Parallel Random-Access Machine (PRAM), Split-Transfer Torque RAM (STT-RAM), Silicon Oxime Nitride Oxide Silicon (SONOS), Resistive RAM (RRAM), Nano RAM (NRAM), 3D XPoint, Domain-Wall Memory (DWM), and millipede memory.

Semi-volatile memory which may have some limited non-volatile duration after power is removed but loses data after said duration has passed. Semi-volatile memory provides high performance, durability, and other valuable characteristics typically associated with volatile memory, while providing some benefits of true non-volatile memory. The semi-volatile memory may comprise volatile and non-volatile memory and/or volatile memory with battery to provide power after power is removed. The semi-volatile memory may comprise, but not limited to spin-transfer torque RAM (STT-RAM).

Consistent with the embodiments of the present disclosure, the aforementioned computing device 500 may employ the communication system between an information processing system, such as the computing device 500, and the outside world, for example, but not limited to, human, environment, and another computing device 500. The aforementioned communication system will be known to a person having ordinary skill in the art as I/O 560. The I/O module 560 regulates a plurality of inputs and outputs with regard to the computing device 500, wherein the inputs are a plurality of signals and data received by the computing device 500, and the outputs are the plurality of signals and data sent from the computing device 500. The I/O module 560 interfaces a plurality of hardware, such as, but not limited to, non-volatile storage 561, communication devices 562, sensors 563, and peripherals 565. The plurality of hardware is used by at least one of, but not limited to, human, environment, and another computing device 500 to communicate with the present computing device 500. The I/O module 560 may comprise a plurality of forms, for example, but not limited to channel I/O, port mapped I/O, asynchronous I/O, and Direct Memory Access (DMA).

Consistent with the embodiments of the present disclosure, the aforementioned computing device 500 may employ the non-volatile storage sub-module 561, which may be referred to by a person having ordinary skill in the art as one of secondary storage, external memory, tertiary storage, off-line storage, and auxiliary storage. The non-volatile storage sub-module 561 may not be accessed directly by the CPU 520 without using an intermediate area in the memory 550. The non-volatile storage sub-module 561 does not lose data when power is removed and may be two orders of magnitude less costly than storage used in memory modules, at the expense of speed and latency. The non-volatile storage sub-module 561 may comprise a plurality of forms, such as, but not limited to, Direct Attached Storage (DAS), Network Attached Storage (NAS), Storage Area Network (SAN), nearline storage, Massive Array of Idle Disks (MAID), Redundant Array of Independent Disks (RAID), device mirroring, off-line storage, and robotic storage. The non-volatile storage sub-module (561) may comprise a plurality of embodiments, such as, but not limited to:

Optical storage, for example, but not limited to, Compact Disk (CD) (CD-ROM/CD-R/CD-RW), Digital Versatile Disk (DVD) (DVD-ROM/DVD-R/DVD+R/DVD-RW/DVD+RW/DVD±RW/DVD+R DL/DVD-RAM/

HD-DVD), Blu-ray Disk (BD) (BD-ROM/BD-R/BD-RE/BD-R DL/BD-RE DL), and Ultra-Density Optical (UDO).

Semiconductor storage, for example, but not limited to, flash memory, such as, but not limited to, USB flash drive, Memory card, Subscriber Identity Module (SIM) card, Secure Digital (SD) card, Smart Card, Compact-Flash (CF) card, Solid-State Drive (SSD) and memristor.

Magnetic storage such as, but not limited to, Hard Disk Drive (HDD), tape drive, carousel memory, and Card Random-Access Memory (CRAM).

Phase-change memory

Holographic data storage such as Holographic Versatile Disk (HVD).

Molecular Memory

Deoxyribonucleic Acid (DNA) digital data storage

Consistent with the embodiments of the present disclosure, the aforementioned computing device 500 may employ the communication sub-module 562 as a subset of the I/O 560, which may be referred to by a person having ordinary skill in the art as at least one of, but not limited to, computer network, data network, and network. The network allows computing devices 500 to exchange data using connections, which may be known to a person having ordinary skill in the art as data links, between network nodes. The nodes comprise network computer devices 500 that originate, route, and terminate data. The nodes are identified by network addresses and can include a plurality of hosts consistent with the embodiments of a computing device 500. The aforementioned embodiments include, but not limited to personal computers, phones, servers, drones, and networking devices such as, but not limited to, hubs, switches, routers, modems, and firewalls.

Two nodes can be networked together, when one computing device 500 is able to exchange information with the other computing device 500, whether or not they have a direct connection with each other. The communication sub-module 562 supports a plurality of applications and services, such as, but not limited to World Wide Web (WWW), digital video and audio, shared use of application and storage computing devices 500, printers/scanners/fax machines, email/online chat/instant messaging, remote control, distributed computing, etc. The network may comprise a plurality of transmission mediums, such as, but not limited to conductive wire, fiber optics, and wireless. The network may comprise a plurality of communications protocols to organize network traffic, wherein application-specific communications protocols are layered, may be known to a person having ordinary skill in the art as carried as payload, over other more general communications protocols. The plurality of communications protocols may comprise, but not limited to, IEEE 802, ethernet, Wireless LAN (WLAN/Wi-Fi), Internet Protocol (IP) suite (e.g., TCP/IP, UDP, Internet Protocol version 5 [IPv5], and Internet Protocol version 6 [IPv6]), Synchronous Optical Networking (SONET)/Synchronous Digital Hierarchy (SDH), Asynchronous Transfer Mode (ATM), and cellular standards (e.g., Global System for Mobile Communications [GSM], General Packet Radio Service [GPRS], Code-Division Multiple Access [CDMA], and Integrated Digital Enhanced Network [IDEN]).

The communication sub-module 562 may comprise a plurality of size, topology, traffic control mechanism and organizational intent. The communication sub-module 562 may comprise a plurality of embodiments, such as, but not limited to:

Wired communications, such as, but not limited to, coaxial cable, phone lines, twisted pair cables (ethernet), and InfiniBand.

Wireless communications, such as, but not limited to, communications satellites, cellular systems, radio frequency/spread spectrum technologies, IEEE 802.11 Wi-Fi, Bluetooth, NFC, free-space optical communications, terrestrial microwave, and Infrared (IR) communications. Cellular systems embody technologies such as, but not limited to, 3G,5G (such as WiMax and LTE), and 5G (short and long wavelength).

Parallel communications, such as, but not limited to, LPT ports.

Serial communications, such as, but not limited to, RS-232 and USB.

Fiber Optic communications, such as, but not limited to, Single-mode optical fiber (SMF) and Multi-mode optical fiber (MMF).

Power Line and wireless communications

The aforementioned network may comprise a plurality of layouts, such as, but not limited to, bus network such as ethernet, star network such as Wi-Fi, ring network, mesh network, fully connected network, and tree network. The network can be characterized by its physical capacity or its organizational purpose. Use of the network, including user authorization and access rights, differ accordingly. The characterization may include, but not limited to nanoscale network, Personal Area Network (PAN), Local Area Network (LAN), Home Area Network (HAN), Storage Area Network (SAN), Campus Area Network (CAN), backbone network, Metropolitan Area Network (MAN), Wide Area Network (WAN), enterprise private network, Virtual Private Network (VPN), and Global Area Network (GAN).

Consistent with the embodiments of the present disclosure, the aforementioned computing device 500 may employ the sensors sub-module 563 as a subset of the I/O 560. The sensors sub-module 563 comprises at least one of the devices, modules, and subsystems whose purpose is to detect events or changes in its environment and send the information to the computing device 500. Sensors are sensitive to the measured property, are not sensitive to any property not measured, but may be encountered in its application, and do not significantly influence the measured property. The sensors sub-module 563 may comprise a plurality of digital devices and analog devices, wherein if an analog device is used, an Analog to Digital (A-to-D) converter must be employed to interface the said device with the computing device 500. The sensors may be subject to a plurality of deviations that limit sensor accuracy. The sensors sub-module 563 may comprise a plurality of embodiments, such as, but not limited to, chemical sensors, automotive sensors, acoustic/sound/vibration sensors, electric current/electric potential/magnetic/radio sensors, environmental/weather/moisture/humidity sensors, flow/fluid velocity sensors, ionizing radiation/particle sensors, navigation sensors, position/angle/displacement/distance/speed/acceleration sensors, imaging/optical/light sensors, pressure sensors, force/density/level sensors, thermal/temperature sensors, and proximity/presence sensors. It should be understood by a person having ordinary skill in the art that the ensuing are non-limiting examples of the aforementioned sensors:

Chemical sensors, such as, but not limited to, breathalyzer, carbon dioxide sensor, carbon monoxide/smoke detector, catalytic bead sensor, chemical field-effect transistor, chemiresistor, electrochemical gas sensor, electronic nose, electrolyte-insulator-semiconductor sensor, energy-dispersive X-ray spectroscopy, fluorescent chloride sensors, holographic sensor, hydrocarbon dew point analyzer, hydrogen sensor, hydrogen sulfide sensor, infrared point sensor, ion-selective electrode, nondispersive infrared sensor, microwave chemistry sensor, nitrogen oxide sensor, olfactometer, optode, oxygen sensor, ozone monitor, pellistor, pH glass electrode, potentiometric sensor, redox electrode, zinc oxide nanorod sensor, and biosensors (such as nano-sensors).

Automotive sensors, such as, but not limited to, air flow meter/mass airflow sensor, air-fuel ratio meter, AFR sensor, blind spot monitor, engine coolant/exhaust gas/cylinder head/transmission fluid temperature sensor, hall effect sensor, wheel/automatic transmission/turbine/vehicle speed sensor, airbag sensors, brake fluid/engine crankcase/fuel/oil/tire pressure sensor, camshaft/crankshaft/throttle position sensor, fuel/oil level sensor, knock sensor, light sensor, MAP sensor, oxygen sensor (02), parking sensor, radar sensor, torque sensor, variable reluctance sensor, and water-in-fuel sensor.

- Acoustic, sound and vibration sensors, such as, but not limited to, microphone, lace sensor (guitar pickup), seismometer, sound locator, geophone, and hydrophone.
- Electric current, electric potential, magnetic, and radio sensors, such as, but not limited to, current sensor, Daly detector, electroscope, electron multiplier, faraday cup, galvanometer, hall effect sensor, hall probe, magnetic anomaly detector, magnetometer, magnetoresistance, MEMS magnetic field sensor, metal detector, planar hall sensor, radio direction finder, and voltage detector.
- Environmental, weather, moisture, and humidity sensors, such as, but not limited to, actinometer, air pollution sensor, bedwetting alarm, ceilometer, dew warning, electrochemical gas sensor, fish counter, frequency domain sensor, gas detector, hook gauge evaporimeter, humistor, hygrometer, leaf sensor, lysimeter, pyranometer, pyrgeometer, psychrometer, rain gauge, rain sensor, seismometers, SNOTEL, snow gauge, soil moisture sensor, stream gauge, and tide gauge.
- Flow and fluid velocity sensors, such as, but not limited to, air flow meter, anemometer, flow sensor, gas meter, mass flow sensor, and water meter.
- Ionizing radiation and particle sensors, such as, but not limited to, cloud chamber, Geiger counter, Geiger-Muller tube, ionization chamber, neutron detection, proportional counter, scintillation counter, semiconductor detector, and thermos-luminescent dosimeter.
- Navigation sensors, such as, but not limited to, air speed indicator, altimeter, attitude indicator, depth gauge, fluxgate compass, gyroscope, inertial navigation system, inertial reference unit, magnetic compass, MHD sensor, ring laser gyroscope, turn coordinator, variometer, vibrating structure gyroscope, and yaw rate sensor.
- Position, angle, displacement, distance, speed, and acceleration sensors, such as, but not limited to, accelerometer, displacement sensor, flex sensor, free fall sensor, gravimeter, impact sensor, laser rangefinder, LIDAR, odometer, photoelectric sensor, position sensor such as, but not limited to, GPS or Glonass, angular rate sensor, shock detector, ultrasonic sensor, tilt sensor, tachometer, ultra-wideband radar, variable reluctance sensor, and velocity receiver.
- Imaging, optical and light sensors, such as, but not limited to, CMOS sensor, LiDAR, multi-spectral lightsensor, colorimeter, contactimage sensor, electro-optical sensor, infra-red sensor, kinetic inductance detector, LED as light sensor, light-addressable potentiometric sensor, Nichols radiometer, fiber-optic sensors, optical position sensor, thermopile laser sensor, photodetector, photodiode, photomultiplier tubes, phototransistor, photoelectric sensor, photoionization detector, photomultiplier, photoresistor, photo-switch, phototube, scintillometer, Shack-Hartmann, single-photon avalanche diode, superconducting nanowire single-photon detector, transition edge sensor, visible light photon counter, and wavefront sensor.
- Pressure sensors, such as, but not limited to, barograph, barometer, boost gauge, bourdon gauge, hot filament ionization gauge, ionization gauge, McLeod gauge, Oscillating U-tube, permanent downhole gauge, piezometer, Pirani gauge, pressure sensor, pressure gauge, tactile sensor, and time pressure gauge.
- Force, Density, and Level sensors, such as, but not limited to, bhangmeter, hydrometer, force gauge or force sensor, level sensor, load cell, magnetic level or nuclear density sensor or strain gauge, piezo capacitive pressure sensor, piezoelectric sensor, torque sensor, and viscometer.
- Thermal and temperature sensors, such as, but not limited to, bolometer, bimetallic strip, calorimeter, exhaust gas temperature gauge, flame detection/pyrometer, Gardon gauge, Golay cell, heat flux sensor, microbolometer, microwave radiometer, net radiometer, infrared/quartz/resistance thermometer, silicon bandgap temperature sensor, thermistor, and thermocouple.
- Proximity and presence sensors, such as, but not limited to, alarm sensor, doppler radar, motion detector, occupancy sensor, proximity sensor, passive infrared sensor, reed switch, stud finder, triangulation sensor, touch switch, and wired glove.

Consistent with the embodiments of the present disclosure, the aforementioned computing device 500 may employ the peripherals sub-module 562 as a subset of the I/O 560. The peripheral sub-module 565 comprises ancillary devices used to put information into and get information out of the computing device 500. There are 3 categories of devices comprising the peripheral sub-module 565, which exist based on their relationship with the computing device 500, input devices, output devices, and input/output devices. Input devices send at least one of data and instructions to the computing device 500. Input devices can be categorized based on, but not limited to:

- Modality of input, such as, but not limited to, mechanical motion, audio, visual, and tactile.
- Whether the input is discrete, such as but not limited to, pressing a key, or continuous such as, but not limited to position of a mouse.
- The number of degrees of freedom involved, such as, but not limited to, two-dimensional mice vs three-dimensional mice used for Computer-Aided Design (CAD) applications.

Output devices provide output from the computing device 500. Output devices convert electronically generated information into a form that can be presented to humans. Input/output devices that perform both input and output functions. It should be understood by a person having ordinary skill in the art that the ensuing are non-limiting embodiments of the aforementioned peripheral sub-module 565:

Input Devices

Human Interface Devices (HID), such as, but not limited to, pointing device (e.g., mouse, touchpad, joystick, touchscreen, game controller/gamepad, remote, light pen, light gun, Wii remote, jog dial, shuttle, and knob), keyboard, graphics tablet, digital pen, gesture recognition devices, magnetic ink character recognition, Sip-and-Puff (SNP) device, and Language Acquisition Device (LAD).

High degree of freedom devices, that require up to six degrees of freedom such as, but not limited to, camera gimbals, Cave Automatic Virtual Environment (CAVE), and virtual reality systems.

Video Input devices are used to digitize images or video from the outside world into the computing device 500. The information can be stored in a multitude of formats depending on the user's requirement. Examples of types of video input devices include, but not limited to, digital camera, digital camcorder, portable media player, webcam, Microsoft Kinect, image scanner, fingerprint scanner, barcode reader, 3D scanner, laser rangefinder, eye gaze tracker, computed tomography, magnetic resonance imaging, positron emission tomography, medical ultrasonography, TV tuner, and iris scanner.

Audio input devices are used to capture sound. In some cases, an audio output device can be used as an input device, in order to capture produced sound. Audio input devices allow a user to send audio signals to the computing device 500 for at least one of processing, recording, and carrying out commands. Devices such as microphones allow users to speak to the computer in order to record a voice message or navigate software. Aside from recording, audio input devices are also used with speech recognition software. Examples of types of audio input devices include, but not limited to microphone, Musical Instrument Digital Interface (MIDI) devices such as, but not limited to a keyboard, and headset.

Data Acquisition (DAQ) devices convert at least one of analog signals and physical parameters to digital values for processing by the computing device 500. Examples of DAQ devices may include, but not limited to, Analog to Digital Converter (ADC), data logger, signal conditioning circuitry, multiplexer, and Time to Digital Converter (TDC).

Output Devices may further comprise, but not be limited to:

Display devices, which convert electrical information into visual form, such as, but not limited to, monitor, TV, projector, and Computer Output Microfilm (COM). Display devices can use a plurality of underlying technologies, such as, but not limited to, Cathode-Ray Tube (CRT), Thin-Film Transistor (TFT), Liquid Crystal Display (LCD), Organic Light-Emitting Diode (OLED), MicroLED, E Ink Display (ePaper) and Refreshable Braille Display (Braille Terminal).

Printers, such as, but not limited to, inkjet printers, laser printers, 3D printers, solid ink printers and plotters.

Audio and Video (AV) devices, such as, but not limited to, speakers, headphones, amplifiers and lights, which include lamps, strobes, DJ lighting, stage lighting, architectural lighting, special effect lighting, and lasers.

Other devices such as Digital to Analog Converter (DAC)

Input/Output Devices may further comprise, but not be limited to, touchscreens, networking device (e.g., devices disclosed in network 562 sub-module), data storage device (non-volatile storage 561), facsimile (FAX), and graphics/sound cards.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The following is claimed:

1. A system for matrix-based homomorphic encryption, comprising:
    a processor of a computing node configured to host a homomorphic encryption module and connected to at least one cloud server; and
    a memory on which are stored machine-readable instructions that when executed by the processor, cause the processor to:
    acquire plaintext M required to be encrypted;
    select a size of a matrix $\ell$ and modulus n;
    select invertible $\ell \times \ell$ matrix $S_1$ over $\mathbb{Z}_n$, wherein $\mathbb{Z}_n$ is a residue ring modulo n;
    compute an invertible $\ell \times \ell$ matrix $S_2$ over $\mathbb{Z}_n$;
    set a secret key $(S_1, S_2)$; and
    encode the plaintext M by an integer m over $\mathbb{Z}_n$, wherein m is encoded by an envelope matrix comprising a form $$V(m) = \left(\begin{array}{c|c} \alpha & 0 \\ \hline \beta & m \end{array}\right),$$

wherein $\alpha$ and $\beta$ are numbers chosen at random $\alpha, \beta \in \mathbb{Z}_n$.

2. The system of claim 1, wherein the machine-readable instructions that when executed by the processor, cause the processor to:
    select the invertible $\ell \times \ell$ matrix $S_1$ over $\mathbb{R}$, wherein $\mathbb{R}$, is a field of real numbers; and
    compute the invertible $\ell \times \ell$ matrix $S_2$ over $\mathbb{R}$.

3. The system of claim 2, wherein the machine-readable instructions that when executed by the processor, cause the processor to encode the M by a floating-point number m, over $\mathbb{R}$, wherein m is encoded by an envelope matrix comprising a form $$V(m) = \left(\begin{array}{c|c} \alpha & 0 \\ \hline \beta & m \end{array}\right),$$

wherein $\alpha$ and $\beta$ are floating point numbers chosen over $\mathbb{R}$ at random.

4. The system of claim 1, wherein the machine-readable instructions that when executed by the processor, cause the processor to access the envelop matrix V(m) over $\mathbb{Z}_n$.

5. The system of claim 4, wherein the machine-readable instructions that when executed by the processor, cause the processor to compute a ciphertext C(m) of the plaintext M by $C(m) = S_2 V(m) S_1$, where $(S_1, S_2)$ is the secret key.

6. The system of claim 1, wherein the machine-readable instructions that when executed by the processor, cause the processor to access the envelop matrix V(m) over $\mathbb{R}$.

7. The system of claim 5, wherein the machine-readable instructions that when executed by the processor, cause the processor to decrypt encrypted plaintext M by:
- accessing the ciphertext C(m) over $\mathbb{Z}_n$;
- computing $S_2^{-1}(C(m))S_1^{-1} = V(m)$ over $\mathbb{Z}_n$, using $(S_1, S_2)$, wherein $S_1, S_2$ are two matrices used as the secret key and $S_1^{-1}$ and $S_2^{-1}$ are inverse matrices, and
- extracting the plaintext m from the envelop matrix V(m).

8. The system of claim 5, wherein the machine-readable instructions that when executed by the processor, cause the processor to decrypt encrypted plaintext M by:
- accessing the ciphertext C(m) over $\mathbb{R}$;
- computing $S_2^{-1}(C(m))S_1^{-1} = V(m)$ over $\mathbb{R}$ using the secret key $(S_1, S_2)$, wherein $S_1, S_2$ are two matrices used as the secret key and $S_1^{-1}$ and $S_2^{-1}$ are inverse matrices; and
- extracting the plaintext m from the envelop matrix V(m).

9. The system of claim 5, wherein the machine-readable instructions that when executed by the processor, cause the processor to execute homomorphic operations over cyphertexts computed as $C(m) = S_2 V(m) S_1$, wherein the homomorphic operations comprising any of: addition, subtraction, multiplication, and division of encrypted data.

10. The system of claim 9, wherein the machine-readable instructions that when executed by the processor, cause the processor to execute homomorphic operations over ciphertexts computed as $C(m) = S_2 V(m) S_1$, comprising any of: encrypted search based on homomorphic index, generation of homomorphic hash and homomorphic comparison.

11. A method for matrix-based homomorphic encryption, comprising:
- acquiring, by a computing node, plaintext M required to be encrypted;
- selecting, by the computing node, a size of a matrix $\ell$ and modulus n;
- selecting, by the computing node, invertible $\ell \times \ell$ matrix $S_1$ over $\mathbb{Z}_n$, wherein $\mathbb{Z}_n$ is a residue ring modulo n;
- computing, by the computing node, an invertible $\ell \times \ell$ matrix $S_2$ over $\mathbb{Z}_n$;
- setting, by the computing node, a secret key $(S_1, S_2)$; and
- encoding the plaintext M by an integer m over $\mathbb{Z}_n$, wherein m is encoded by an envelope matrix comprising a form $$V(m) = \left(\begin{array}{c|c}\alpha & 0 \\ \hline \beta & m\end{array}\right),$$

wherein $\alpha$ and $\beta$ are numbers chosen at random $\alpha, \beta \in \mathbb{Z}_n$.

12. The method of claim 11, further comprising:
- selecting the invertible $\ell \times \ell$ matrix $S_1$ over $\mathbb{R}$, wherein $\mathbb{R}$ is a field of real numbers; and
- computing the invertible $\ell \times \ell$ matrix $S_2$ over $\mathbb{R}$.

13. The method of claim 11, further comprising encoding the M by a floating-point number m, over $\mathbb{R}$, wherein m is encoded by an envelope matrix comprising a form $$V(m) = \left(\begin{array}{c|c}\alpha & 0 \\ \hline \beta & m\end{array}\right),$$

wherein $\alpha$ and $\beta$ are floating point numbers chosen at random over $\mathbb{R}$.

14. The method of claim 11, further comprising accessing the envelop matrix V(m) over $\mathbb{Z}_n$.

15. The method of claim 14, further comprising computing a ciphertext C(m) of the plaintext M by $C(m) = S_2 V(m) S_1$, where $(S_1, S_2)$ is the secret key.

16. The method of claim 11, further comprising accessing the envelop matrix V(m) over $\mathbb{R}$.

17. The method of claim 11, further comprising decrypting encrypted plaintext M by:
- accessing the ciphertext C(m) over $\mathbb{Z}_n$;
- computing $S_2^{-1}(C(m))S_1^{-1} = V(m)$ over $\mathbb{Z}_n$, using $(S_1, S_2)$, wherein $S_1, S_2$ are two matrices used as the secret key and $S_1^{-1}$ and $S_2^{-1}$ are inverse matrices, and
- extracting the plaintext m from the envelop matrix V(m).

18. The method of claim 11, further comprising decrypting encrypted plaintext M by:
- accessing the ciphertext C(m) over $\mathbb{R}$;
- computing $S_2^{-1}(C(m))S_1^{-1} = V(m)$ over $\mathbb{R}$ using the secret key $(S_1, S_2)$, wherein $S_1, S_2$ are two matrices used as the secret key and $S_1^{-1}$ and $S_2^{-1}$ are inverse matrices; and
- extracting the plaintext m from the envelop matrix V(m).

19. A non-transitory computer-readable medium comprising instructions, that when read by a processor, cause the processor to perform:
- acquiring plaintext M required to be encrypted;
- selecting a size of a matrix $\ell$ and modulus n;
- selecting invertible $\ell \times \ell$ matrix $S_1$ over $\mathbb{Z}_n$, wherein $\mathbb{Z}_n$ is a residue ring modulo n;
- computing an invertible matrix $S_2$ over $\mathbb{Z}_n$;
- setting a secret key $(S_1, S_2)$; and
- encoding the plaintext M by an integer m over $\mathbb{Z}_n$, wherein m is encoded by an envelope matrix comprising a form $$V(m) = \left(\begin{array}{c|c}\alpha & 0 \\ \hline \beta & m\end{array}\right),$$

wherein $\alpha$ and $\beta$ are numbers chosen at random $\alpha, \beta \in \mathbb{Z}_n$.

20. The non-transitory computer-readable medium comprising instructions, that when read by a processor, cause the processor to compute a ciphertext C(m) of the plaintext m by $C(m) = S_2 V(m) S_1$, where $(S_1, S_2)$ is the secret key.

* * * * *